(12) United States Patent
Nguyen et al.

(10) Patent No.: US 12,513,286 B2
(45) Date of Patent: Dec. 30, 2025

(54) MULTI-COMPONENT PICTURE OR VIDEO CODING CONCEPT

(71) Applicant: DOLBY VIDEO COMPRESSION, LLC, Wilmington, DE (US)

(72) Inventors: Tung Nguyen, Berlin (DE); Ali Atelf Ibrahim Khairat Abdelhamid, Berlin (DE); Detlev Marpe, Berlin (DE)

(73) Assignee: DOLBY VIDEO COMPRESSION, LLC, San Francisco, CA (US)

( * ) Notice: Subject to any disclaimer, the term of this patent is extended or adjusted under 35 U.S.C. 154(b) by 160 days.

(21) Appl. No.: 18/363,829

(22) Filed: Aug. 2, 2023

(65) Prior Publication Data

US 2023/0379454 A1   Nov. 23, 2023

Related U.S. Application Data

(63) Continuation of application No. 17/019,770, filed on Sep. 14, 2020, now Pat. No. 11,765,342, which is a
(Continued)

(30) Foreign Application Priority Data

Oct. 18, 2013  (EP) .................................... 13189444

(51) Int. Cl.
*H04N 19/186* (2014.01)
*H04N 19/105* (2014.01)
(Continued)

(52) U.S. Cl.
CPC ......... *H04N 19/105* (2014.11); *H04N 19/157* (2014.11); *H04N 19/159* (2014.11);
(Continued)

(58) Field of Classification Search
CPC .. H04N 19/105; H04N 19/157; H04N 19/159; H04N 19/172; H04N 19/176; H04N 19/186
(Continued)

(56) References Cited

U.S. PATENT DOCUMENTS 6,785,425 B1    8/2004  Feder .................. H04N 19/593
                                                                  382/247
8,331,664 B2   12/2012  Strom et al.
(Continued)

FOREIGN PATENT DOCUMENTS

CN   101160972 A    4/2008
CN   101335902 A1  12/2008
(Continued)

OTHER PUBLICATIONS

Office Action issued in corresponding Korean Patent Application 10-2022-7039326 dated Jul. 10, 2023, with English abstract.
(Continued)

*Primary Examiner* — Albert Kir
(74) *Attorney, Agent, or Firm* — Morgan, Lewis & Bockius LLP

(57) ABSTRACT

The coding efficiency of a multi-component picture or video coding concept is improved by reconstructing a third component signal relating to a third component of the multi-component video using inter-component prediction from both a reconstructed first component signal and a reconstructed second component signal.

15 Claims, 15 Drawing Sheets

Related U.S. Application Data continuation of application No. 16/257,208, filed on Jan. 25, 2019, now Pat. No. 10,778,968, which is a continuation of application No. 15/096,512, filed on Apr. 12, 2016, now Pat. No. 10,230,949, which is a continuation of application No. PCT/EP2014/072350, filed on Oct. 17, 2014.

(51) Int. Cl.
  H04N 19/157    (2014.01)
  H04N 19/159    (2014.01)
  H04N 19/172    (2014.01)
  H04N 19/176    (2014.01)

(52) U.S. Cl.
  CPC ......... *H04N 19/172* (2014.11); *H04N 19/176* (2014.11); *H04N 19/186* (2014.11)

(58) Field of Classification Search
  USPC .................................................. 375/240.02
  See application file for complete search history.

(56) References Cited

U.S. PATENT DOCUMENTS

| | | | |
|---|---|---|---|
| 8,761,503 B2 | 6/2014 | Song | H04N 19/46 382/238 |
| 9,307,255 B2 | 4/2016 | Kim | |
| 2001/0026641 A1 | 10/2001 | Kimura | H04N 19/142 375/E7.181 |
| 2007/0014478 A1 | 1/2007 | Birinov | H04N 19/61 375/E7.17 |
| 2008/0304759 A1 | 12/2008 | Lee | H04N 19/176 382/238 |
| 2010/0034265 A1 | 2/2010 | Kim | H04N 19/11 375/240.13 |
| 2012/0307897 A1 | 12/2012 | Yang | H04N 19/50 375/240.12 |
| 2012/0307899 A1 | 12/2012 | Kim | H04N 19/186 375/E7.032 |
| 2013/0011059 A1 | 1/2013 | Strom | H04N 19/105 382/166 |
| 2013/0039422 A1 | 2/2013 | Kirchhoffer | H04N 19/593 375/E7.188 |
| 2014/0086318 A1 | 3/2014 | Kerofsky | H04N 19/33 375/240.12 |
| 2015/0016512 A1 | 1/2015 | Pu et al. | |
| 2015/0117519 A1* | 4/2015 | Kim | H04N 19/105 375/240.02 |
| 2015/0124865 A1* | 5/2015 | Kim | H04N 19/105 375/240.12 |
| 2015/0382016 A1 | 12/2015 | Cohen | H04N 19/70 375/240.12 |
| 2016/0029035 A1 | 1/2016 | Nguyen | H04N 19/597 375/240.12 |
| 2024/0205438 A1* | 6/2024 | Kuo | H04N 19/176 |
| 2024/0275999 A1* | 8/2024 | Chen | H04N 19/577 |

FOREIGN PATENT DOCUMENTS

| | | |
|---|---|---|
| CN | 101352046 A1 | 1/2009 |
| CN | 102939750 A | 2/2013 |
| CN | 102939754 A | 2/2013 |
| CN | 102939756 A | 2/2013 |
| EP | 2036358 A1 | 3/2009 |
| JP | 2008198174 A | 8/2008 |
| JP | 2009-518940 A | 5/2009 |
| JP | 2010-239666 A | 10/2010 |
| WO | 2011071254 A2 | 6/2011 |
| WO | 2012002765 A2 | 1/2012 |
| WO | WO-2014166965 A1 * | 10/2014 ........... H04N 19/103 |

OTHER PUBLICATIONS

Office Action issued in corresponding Japanese Patent Application 2021-024168 dated Jan. 4, 2023, with English abstract.

Office Action issued in corresponding European Patent Application 20 211 115.9-1208 dated Feb. 10, 2023.

Office Action {Notice of Issuance) issued in corresponding Chinese Patent Application No. 2020101026945 dated Oct. 9, 2022, with English translation.

Office Action {Decision to Grant a Patent) issued in corresponding Korean Patent Application 10-2021-7001734 dated Aug. 9, 2022, with English translation.

Office Action issued in corresponding Japanese Patent Application 2021-024168 issued May 31, 2022, with English translation.

A. Khairat et al., "Non-RCE1: Extended Adaptive Inter-Component Prediction", Joint Collaborative Team on Video Coding (JCT-VG) of ITU-T SG16 WP3 and ISO/IEC JTC1/SC29/WG11, JCTVC-00150, 15th Meeting: Geneva, CH, Oct. 2013, pp. 1-6.

Office Action issued in corresponding Korean Patent Application No. 10-2021-7001734 dated Jan. 7, 2022, with English translation.

Office Action issued in corresponding Chinese Patent Application No. 2020101026945 dated Jan. 28, 2022, with English translation.

Office Action issued in corresponding Korean Patent Application No. 10-2021-7001734 dated Mar. 25, 2021, with English translation.

Extended European Search Report issued in corresponding European Patent Application No. 20 211 115.9-1208 dated May 21, 2021.

Decision to Grant Patent issued in corresponding Japanese Patent Application No. 2018-202249 issued Jan. 19, 2021, with English translation.

Pu et al., "Non-RCE1: Inter Color Component Residual Prediction" Joint Collaborative Team on Video Coding (JCT- VC) OF ITU-T SG 16 WP 3 and ISO/IEC JTC 1/SC 29/WG 11 14th Meeting: Vienna, AT, Jul. 25- Aug. 2, 2013 (Year: 2013).

Pu, W., et al., "Non RCE1: inter Color Component Residual Prediction", 14th JCT-VC Meeting; Jul. 25- Aug. 2, 2013; Vienna, Joint Collaborative Team on Video Coding of ITU-T SG 16 WP3 and ISO/IEC JTC 1/SC 29/WG 11, XP30114791, 7 pages.

Written Opinion and International Search Report dated Jan. 15, 2015, issued in parent PCT/EP2014/072350, 7 pages.

Office Action mailed Jul. 25, 2017 in Japanese Application 2016-524405.

Kim et al., High-Fidelity RGB Video Coding Using Adaptive Inter-Plane Weighted Prediction, IEEE Transactions on Circuits and Systems for Video Technology, Jul. 2009, vol. 19, No. 7, pp. 1051-1056.

Nguyen et al., Non-RCE-1/on/RCE2/AH65/AHGB: Adaptive Inter-Plane Prediction for RGB Content, JCTVC-M0230, Apr. 23, 2013.

Kawamura et al., Non-CE1: Inter colour-component residual coefficients prediction, JCTVC-00263, Oct. 15, 2013.

Office Action issued in corresponding Chinese Patent Application No. 2014800566879 dated Apr. 23, 2018 with English translation.

Non-final Office Action U.S. Appl. No. 15/096,512 dated May 1, 2018.

Notice of Allowance U.S. Appl. No. 15/096,512 dated Oct. 25, 2018.

Notice of Issuance issued Dec. 5, 2019 in Chinese Application 201480056687.9.

Office Action issued Oct. 29, 2019 in Japanese Application 2018-202249.

Office Action issued Dec. 25, 2019 in Korean Application 10-2019-7009853.

Notice of Allowance mailed May 13, 2020 in U.S. Appl. No. 16/257,208.

Office Action issued Jun. 16, 2020 in Japanese Application 2018-202249.

\* cited by examiner

MULTI-COMPONENT PICTURE OR VIDEO CODING CONCEPT

CROSS REFERENCE TO RELATED APPLICATIONS

The present application is a continuation of U.S. patent application Ser. No. 17/019,770, filed Sep. 14, 2020, which is a continuation of U.S. patent application Ser. No. 16/257,208, filed Jan. 25, 2019, now U.S. Pat. No. 10,778,968, which is a continuation of U.S. patent application Ser. No. 15/096,512, filed Apr. 12, 2016, which is a continuation of International Application PCT/EP2014/072350, filed Oct. 17, 2014, and additionally claims priority from European Application No. EP 13189444.6. filed Oct. 18, 2013, all of which are incorporated herein by reference in their entireties.

BACKGROUND OF THE INVENTION

The present invention is concerned with multi-component picture or video coding such as the coding of color pictures or videos.

Colored images and videos are represented using a so-called color space with either three or four dimensions and the dimensions are also referred to as components. An example for a three-component color space is the R'G'B' color space. In this color space, the primaries red (R'), green (G'), and blue (B') form the basis of the three dimensional color cube. In the signal processing application space, however, it is crucial to minimize the correlation between the different components in order to achieve high efficiency in terms of power consumption, implementation costs, or compression efficiency in the case of image and video compression. Therefore, R'G'B' signals are often converted to $Y'C_bC_r$ with the first component (Y') being referred to as the luma and the remaining two components ($C_bC_r$) being referred to as the chroma components. In contrast to the R'G'B' color space, the chroma component values of $Y'C_bC_r$ represent a color difference relative to the blue or the red primary. Consequently, the chroma energy is often reduced and hence leads to higher compression efficiency. However, due to the application of a fixed transform, i.e., the R'G'B' to $Y'C_bC_r$ conversion, the resulting output is often not locally optimal. A possibility to overcome such kind of limitations is the application of a local prediction between the color components. Such a prediction is often referred to as inter-component prediction (ICP). The ICP can be applied to both R'G'B' and $Y'C_bC_r$ signals. In the first case, the ICP would result in an energy reduction for the chroma components, and hence, it can be treated as a replacement for the external color space conversion. In the second case, the ICP approach can be treated as a further decorrelation step between the different color components, and hence, the ICP approach results in higher compression efficiency. For the sake of simplification, regardless of the native or input color space, the remaining description refers to luma or Y' to denote the first and the main component and first or second chroma, or respectively $C_b$ or $C_r$, to denote the two remaining chroma components. It is important to note that the order of the chroma components can be important as the processing order can be sequential for some applications.

ICP is, if ever, applied pair-wise, such as for example by predicting one chroma component on the basis of the luma component and doing the same for the other chroma component. It would be favorable, however, to be able to further increase the coding efficiency.

SUMMARY

An embodiment may have a decoder configured to decode a multi-component picture or video spatially sampling a scene with respect to different components, by reconstructing a first component signal relating to a first component of the multi-component picture or video from a data stream; reconstructing a second component signal relating to a second component of the multi-component picture or video from the data stream; reconstructing a third component signal relating to a third component of the multi-component picture or video using inter-component prediction from the reconstructed first component signal and the reconstructed second component signal.

According to another embodiment, a method for decoding a multi-component picture or video spatially sampling a scene with respect to different components may have the steps of: reconstructing a first component signal relating to a first component of the multi-component picture or video from a data stream; reconstructing a second component signal relating to a second component of the multi-component picture or video from the data stream; reconstructing a third component signal relating to a third component of the multi-component picture or video using inter-component prediction from the reconstructed first component signal and the reconstructed second component signal.

Another embodiment may have an encoder configured to encode a multi-component picture or video spatially sampling a scene with respect to different components, by encoding a first component signal relating to a first component of the multi-component picture or video into a data stream; encoding a second component signal relating to a second component of the multi-component picture or video into the data stream; encoding a third component signal relating to a third component of the multi-component picture or video using inter-component prediction from the encoded first component signal and the encoded second component signal.

According to another embodiment, a method for encoding a multi-component picture or video spatially sampling a scene with respect to different components may have the steps of: encoding a first component signal relating to a first component of the multi-component picture or video into a data stream; encoding a second component signal relating to a second component of the multi-component picture or video into the data stream; encoding a third component signal relating to a third component of the multi-component picture or video using inter-component prediction from the encoded first component signal and the encoded second component signal.

Another embodiment may have a non-transitory digital storage medium having a computer program stored thereon to perform the inventive methods when said computer program is run by a computer.

It is a basic finding of the present application that the coding efficiency of a multi-component picture or video coding concept may be improved by reconstructing a third component signal relating to a third component of the multi-component video using inter-component prediction from both a reconstructed first component signal and a reconstructed second component signal.

In accordance with an embodiment of the present application, a multiple source ICP signalization in the data stream is used so as to switch, for different or in units of ICP mode portions of the multi-component picture or video, between different ICP coding modes. The ICP coding modes include a multiple source ICP coding mode and at least one non-ICP coding mode. In ICP mode portions of the multi-component picture or video for which the multiple source ICP coding mode applies, for sub-portions of a picture of the multi-component picture or video, a signalization is provided in the data stream indicating for each sub-portion whether same is inter-component predicted from the spatially corresponding portion of the reconstructed first component signal, the spatially corresponding portion of the reconstructed second component signal or a combination of both. In the at least one non-ICP coding mode, such a combination or change between the spatially corresponding portion of the reconstructed first component signal and the spatially corresponding portion of the reconstructed second component signal is not available. ICP may be switched off completely in ICP mode portions of a non-ICP coding mode, or ICP may be available merely with respect to a fixed one of the first and second component signals. The ICP mode portions may be single pictures, single picture sequences or single slices or consecutively coded pictures, picture sequences or slices. By the juxtaposition of the multiple source ICP coding mode with at least one non-ICP coding mode, any additional signalization overhead, which in accordance with embodiments of the present application may be involved with the sub-picture wise parameterization of the multi-source ICP and may by increased in the case of the multiple source ICP coding mode relative to a non-ICP coding mode, may be restricted to portions of the video where this additional signalization overhead is overcompensated by the coding efficiency gains obtained by the more than one component source available for inter-component prediction.

In accordance with an embodiment, the first component is luma, the second component is a first chroma component and a third component is a second chroma component. In that case, the combined inter-component prediction of the second chroma component on the basis of the luma component and the first chroma component further improves decorrelating the residuals to be coded using, for instance, transform and entropy coding.

In accordance with an embodiment, explicit ICP source signalization in the data stream is used so as to switch, at sub-picture granularity, between reconstructing the third component signal in a current picture of the multi-component picture or video using inter-component prediction from a spatially corresponding portion of the reconstructed first component signal and reconstructing the third component signal in the current picture of the multi-component picture or video using inter-component prediction from a spatially corresponding portion of the reconstructed second component signal. Despite the signalization overhead, the prediction improvement available by this means overcompensates the signalization overhead, thereby yielding higher coding efficiency. Alternatively, implicit signalization may be used. Irrespective of the type of signalization used, the sub-picture granularity may coincide with a granularity at which the reconstruction of the third component signal switches between spatial, temporal and/or inter-view prediction modes, i.e. both switching between spatial, temporal and/or inter-view prediction modes in reconstructing the third component signal as well as the switching between performing ICP based on the first component signal and the second component signal, respectively, may be performed in units of prediction blocks or—using different wording—coding units. Alternatively, transform blocks may be used.

The ICP may be performed using linear prediction. In doing so, ICP prediction parameter signalization in the data stream may be used so as to vary weights at which the reconstructed first component signal and the reconstructed second component signal linearly contribute to the inter-component prediction at sub-picture granularity. That is, two weights may be transmitted in the data stream at the sub-picture granularity, one of which signaling the weight for the reconstructed first component signal and the other indicating the weight for the reconstructed second component signal so that the weighted sum of both yields the inter-component prediction using the two sources. Using the linear prediction, the ICP prediction parameter signalization overhead may be kept at a reasonable cost while nevertheless achieving sufficient decorrelation improvement. As indicated above, the weights may be signaled in the data stream in units of prediction blocks or transform blocks. The available values for the weights may be distributed around zero and may include zero.

In accordance with an embodiment, the just-outlined ICP prediction parameter signalization may involve a conditional signalization of an ICP source indicator: a weight for a respective block is transmitted first, and merely in the case of same being non-zero is the ICP source indicator signaled. By this measure, the signaling overhead associated with the ICP prediction parameter signalization is additionally reduced.

In accordance with an embodiment, the ICP prediction parameter signalization comprises the coding of the weights in a manner so that the weights' sign is coded first with the absolute value of the weights being coded subsequently using context-modeling depending on the sign. By this measure, the probability used to entropy code/decode the absolute value may be set dependent on the sign, thereby resulting in an improved compression rate due to a closer adaptation of the probability used.

In accordance with an embodiment of the present application, the inter-component prediction is applied onto a prediction residual of a spatial/temporal and/or inter-view prediction used in reconstructing the third component signal in an intra-component manner. In other words, the inter-component prediction represents a kind of second-stage prediction relative to the spatial, temporal and/or inter-view intra-component prediction of the third component signal. Likewise, the reconstructed first component signal and the reconstructed second component signal may represent prediction residuals of intra-component spatial, temporal and/or inter-view predictions performed with respect to the first and second components of the multi-component picture or video signal.

The inter-component prediction may be performed in the spatial domain or the spectral domain.

In accordance with another embodiment, explicit ICP source signalization in the data stream is used to switch between the available ICP sources at a first sub-picture granularity, while ICP prediction parameter signalization in the data stream is used so as to adjust a prediction model by way of which the ICP is performed with respect to the signaled ICP source, wherein the entropy coding/decoding of the explicit ICP source signalization involves the usage of a context model which is dependent on the prediction parameter of the prediction model adjusted at a second granularity according to the ICP prediction parameter signalization. By this measure, correlation between both signalizations, i.e. ICP source signalization and ICP prediction parameter signalization, may be exploited to further reduce the signaling overhead.

In accordance with a further embodiment, swap signalization in the data stream is used so as to swap the reconstructed third component signal and the reconstructed second component signal. For example, within one picture the swap signalization changes the order at a sub-picture granularity among first, second and third components so that, for example, within one picture one sub-block has available luma and first chroma component for inter-component predicting the second chroma component, while another sub-block has available luma component and second chroma component for inter-component predicting the first chroma component.

In accordance with an embodiment, the coding of an ICP source indicator for a certain block of a picture is rendered dependent on a difference of a previously coded ICP prediction parameter signalization for the third component and the ICP prediction parameter signalization for the second component: if the difference exceeds a predetermined limit, the ICP source indicator is absent for the respective block. The ICP source indicator may, in that case, be inferred to denote the reconstructed second component signal as ICP source for the third component signal. In other words, if the ICP prediction parameters sent for the current block are sufficiently similar as far as the ICP with respect to the second and third components are concerned, it may be assumed that the component signals of all components are quite similar with the ICP source indicator indicating the reference for ICP for the third component, and if the ICP prediction parameters differ, it may be assumed that the ICP for the third component uses the second component as a basis while the ICP for the second component uses the first component as a basis instead. The first case is more likely to occur in case of RGB color components and the second more likely to occur in case of YCC color components. By this measure, coding efficiency may be increased by lowering the side information overhead for the ICP signaling.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
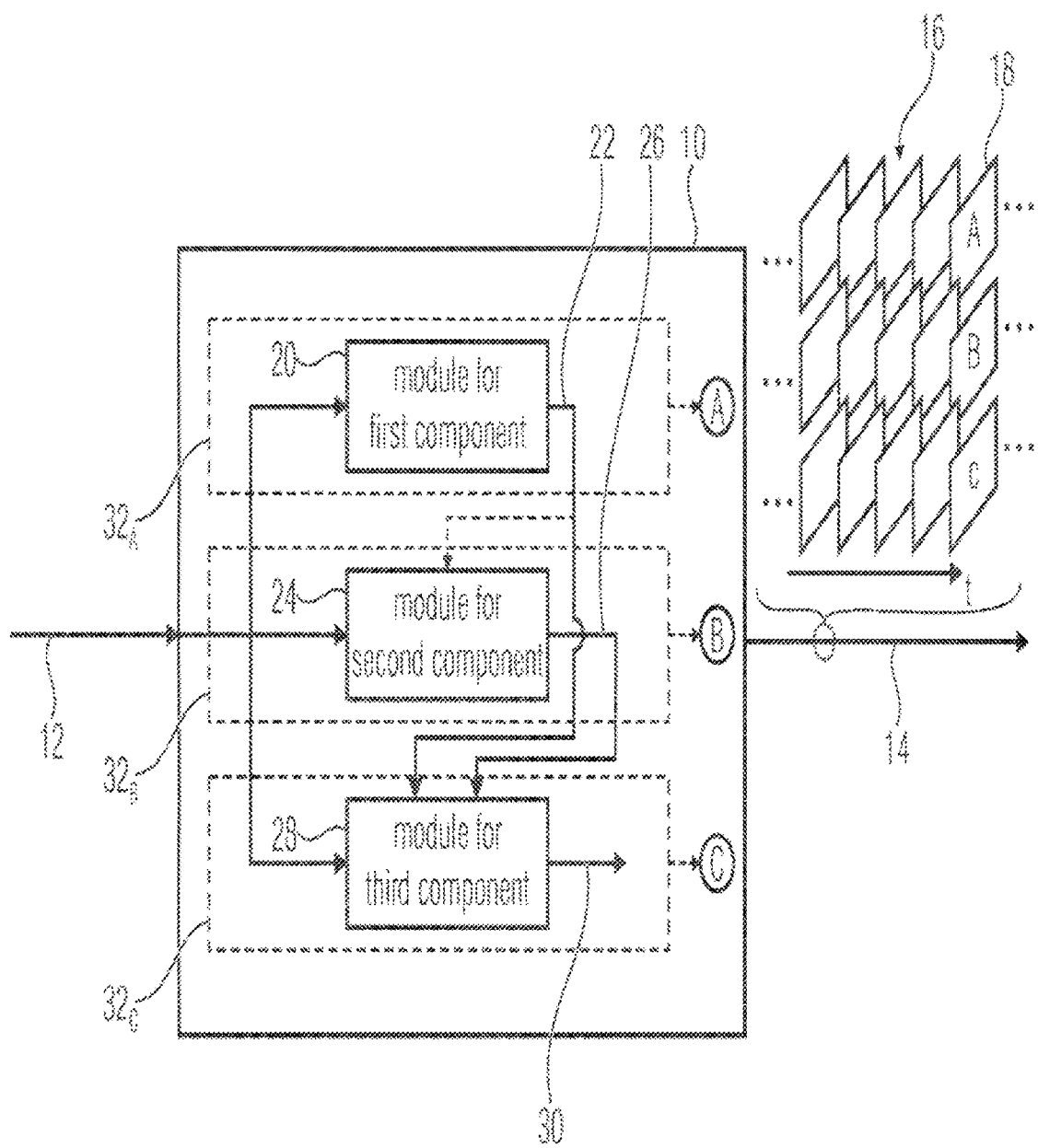
FIG. 1 shows a block diagram of a decoder in accordance with an embodiment of the present application.

FIG. 1 shows a decoder in accordance with an embodiment of the present application. The decoder is generally indicated using reference sign 10 and is configured to decode a multi-component video spatially sampling a scene with respect to different components from a data stream. In particular decoder 10 comprises an input at which the data stream 12 enters decoder 10, and an output at which the multi-component video as reconstructed by the decoding is output, namely output 14. FIG. 1 illustrates the multi-component video at 16 as comprising one picture 18 per one of three components A, B and C for each time instant by exemplarily depicting pictures 18 belonging to one time instant as being arranged one on top of the other with the temporal axis running horizontally. However, it should be noted that there may be more than three components. As outlined above and further outlined below, the components A, B and C may be color components such as R, G and B or one luma and two chroma components or the like. Alternatively, however, the components may relate to another property of the scene such as, for example, components relating to other wavelengths residing outside the visible wavelength range or the like. Moreover, the components are not restricted to frequencies or fragments out of an electromagnetic spectrum of the scene. Rather, the components may relate, for example, at least partially to other physical parameters such as, for example, reflectivity or the like. Although FIG. 1 suggests that the pictures 18 of different components are of the same size and accordingly spatially sample the scene at the same spatial resolution, the spatial resolution may differ among the components. The latter circumstance could in principle also apply to the temporal resolution. That is, the picture rate could differ among the components A to C. If not differing, the term "picture" may alternatively be used to denote the samples of all components A to C at one time instant commonly, Internally, decoder 10 comprises a first module 20 for reconstructing a first component signal 22 relating to a first component A of the multi-component video 16 from the data stream 12, as well as a second module 24 for reconstructing a second component signal 26 relating to a second component B of the multi-component video 16 from the data stream 12, and a module 28 for reconstructing a third component signal 30 relating to a third component C of the multi-component video 16, wherein the latter module 28 has an input connected to outputs of first and second modules 20 and 24 so as to use inter-component prediction from the reconstructed first component signal and the reconstructed second component signals 22 and 26 in reconstructing the third component signal 30. As module 28 uses signals 22 and 26 of first and second components A and B for reconstructing the third component signal relating to component C, the inter-component prediction used by module 28 may be improved, thereby increasing the coding efficiency achievable by the codec to which decoder 10 of FIG. 1 belongs.

As will be outlined in more detail below, modules 20, 24 and 28 may in fact be parts of hybrid-based decoding branches, with one such hybrid-based decoding branch present for each component A, B and C. In FIG. 1, such decoding branches are illustrated by dashed lines $32_A$, $32_B$ and $32_C$, with coding branch $32_A$ comprising module 20 and being configured to reconstruct the first component A from data stream 12, the coding branch $32_B$ comprising module 24 and being configured to reconstruct component B from data stream 12 and decoding branch $32_C$ comprising module 28 and being configured to reconstruct component C from data stream 12. In particular, as will be outlined in more detail below, the first and second component signals 22 and 26 reconstructed by modules 20 and 24 and used for inter-component prediction by module 28 may in fact represent prediction residuals: the reconstructed first component signal 22, for instance, may represent a prediction residual of an intra-component prediction performed by decoding branch $32_A$, i.e. of a prediction performed by module 20 solely on the basis of already reconstructed portions of pictures 18 of component A—solely based on already reconstructed component A picture samples—, wherein the intra-component prediction may be spatial, temporal and/or inter-view prediction. Likewise, the second component signal 26 may represent a prediction residual of an intra-component prediction performed by decoding branch $32_B$, i.e. a prediction solely based on already reconstructed portions of pictures 18 of component B, wherein this intra-component prediction may be spatial, temporal and/or intra-view prediction. Likewise, the reconstructed third component signal 30 may also represent a prediction residual of an intra-component prediction performed by decoding branch $32_C$, i.e. of a prediction solely performed on the basis of already reconstructed portions of pictures 18 of component C, wherein this intra-component prediction may also be spatial, temporal and/or inter-view prediction. The intra-view prediction performed by modules 20, 24 and/or 28 may vary in terms of prediction mode, i.e. whether spatial, temporal and/or inter-view prediction is used. For example, the prediction mode vary at a granularity of coding units or—using a different wording—prediction blocks, i.e. sub-portions of pictures 18, with the prediction mode to be used for a respective coding unit or prediction block being signalized in the data stream 12. The prediction mode may be signaled in the data stream 12 for components A, B and C commonly or individually or, even further, for the first component A on the one hand and the second and third components B and C on the other hand separately. In addition to this intra-component prediction signalization in data stream 12, modules 20, 24 and 28 receive component-specific signaled prediction residual data. The prediction residual data may be transmitted in the data stream in a transform domain, in the form of transform coefficients of a spectral decompositions, or in spatial domain, i.e. in the form of residual samples. If signaled in the spectral domain, the inter-component prediction may either be performed in the spatial domain and/or spectral domain. An ICP domain indicator in data stream 12 may vary the domain within which the inter-component prediction has performed. The ICP domain indicator may vary the domain at picture sequence, single picture or sub-picture granularity such as, for example, in units of the aforementioned prediction blocks or in units of transform blocks in units of which the aforementioned spectral decomposition is performed.

It will be described later that module 24 may also use inter-component prediction, namely inter-component prediction on the basis of the reconstructed first component signal 20 as indicated by a dashed branch leading from the output of module 20 to an input of module 24. That is, module 24 would receive a signaled residual signal for the second component B and could treat the signaled residual signal as a prediction signal of an ICP prediction from first to second component, i.e. A to B, so as to receive the prediction residual for the intra-component prediction within component B. The second component signal 26 used by module 28 for ICP with respect to the third component C could be the result of the module's 24 reconstruction on the basis of the signaled residual signal for component B combined, or not yet combined, with the ICP prediction on the basis of the first component signal 22.

As will also be outlined in more detail below, the ICP prediction performed by module 28 (and optionally by module 24) may be subject to parameterization. This parameterization changes, for example, the ICP of module 28 on the basis of the first and second component signals 22 and 26 at sub-picture granularity with respect to, for example, a selection among the first component signal 22, the second component signal 26 and a combination thereof, with respect to a weight at which the first and second component signals 22 and 26 contribute, in the form of a weighted sum, to the ICP prediction for the third component or the like. Moreover, multiple source ICP signalization in the data stream may signal the general availability or unavailability of the second component signal 26 in addition to the first component signal 22 for ICP within module 28. The scope of such multiple source ICP signalization may relate to a complete video, a single picture or time instant or a sequence of pictures or time instances or a slice or a sequence of slices.

Figure 2:
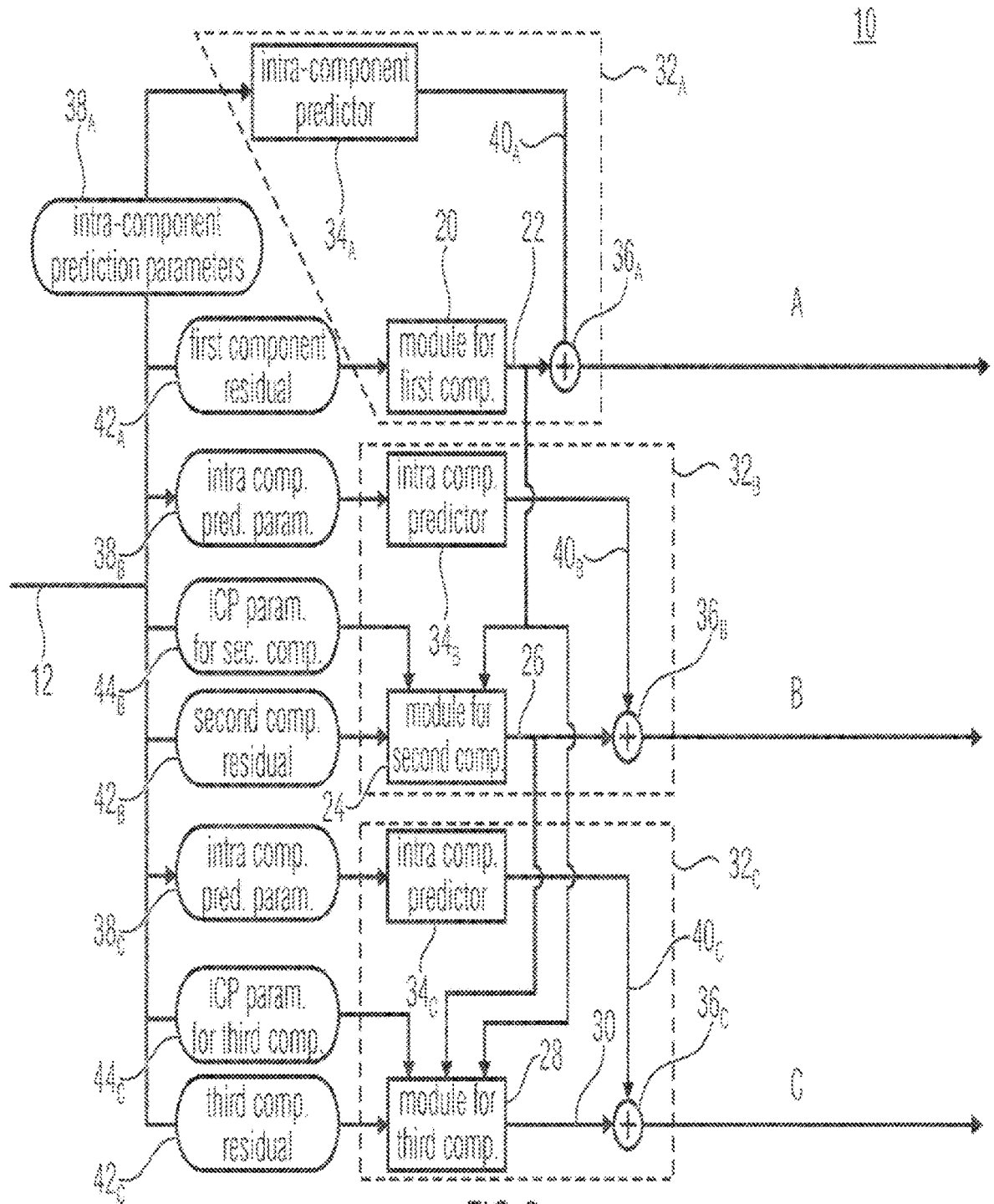
FIG. 2 shows a block diagram of a decoder of an embodiment of the present application applying the ICP onto intra-component prediction residuals.

In order to ease the understanding of the various embodiments further outlined below according to which certain possibilities are discussed as to how the ICP of module 28 may be parameterized and varied by a respective signalization in data stream 12, FIG. 2 shows an embodiment of the decoder representing an example of a more specific implementation of the decoder of FIG. 1, namely one where the component signals 22, 26 and 30 relate to prediction residuals of intra-component predictions performed within the individual decoding branches $32_A$ to $32_C$. After explaining FIG. 2, FIGS. 3 and 4 briefly present embodiments of encoders fitting the embodiments of FIGS. 1 and 2, and then various implementations details for tuning the embodiments of FIGS. 1 to 4 are described with respect to the subsequent figures.

FIG. 2 shows a decoder 10 constructed in accordance with FIG. 1 with three decoding branches $32_A$ to $32_C$, wherein in addition to modules 20, 24 and 28, respectively, each decoding branch comprises an intra-component predictor $34_A$, $34_B$ and $34_C$, respectively and a combiner $36_A$, $36_B$, and $36_C$, respectively, which combines the component signal 22, 26 and 30, respectively, output by modules 20, 24 and 28, respectively, with the intra-component prediction signal output by predictor $34_A$, $34_B$ and $34_C$, respectively. In particular, the intra-component predictor $34_A$ of decoding branch $32_A$ is controlled via intra-component prediction parameters for component A, namely $38_A$, so as to generate by intra-component prediction an intra-component prediction signal $40_A$ which, in turn, is combined by combiner $36_A$ with the reconstructed first component signal 22 so as to result in the reconstructed component A, i.e. the sample values concerning component A of the pictures of the video. Module 20 is fed via data stream 12 with first component residual data $42_A$ signaled, as described above, in spatial or spectral domain, for example, using entropy coding. Likewise, intra-component predictor $34_B$ is controlled by intra-component prediction parameters for component B, namely 38B, in the data stream 12 so as to define therefrom a second component intra-component prediction signal $40_B$ which in turn is combined by combiner $36_B$ with the reconstructed second component signal 26 output by module 24. Module 24 is fed by second component residual data $42_B$, which like residual data $42_A$ may be present in the data stream 12 in the spatial domain in the form of residual samples or in the form of transform coefficients of a spectral decomposition transform locally applied. In accordance with the embodiment shown in FIG. 2, module 24 is, however, additionally controlled via ICP parameter data for the second component, namely $44_B$, present in data stream 12 so as to vary the inter-component prediction applied by module 24 on the basis of the first component signal 22. This option is, as described above, optional and may be left out. In particular, module 24 internally combines signals 22 and the residual signal retrieved from data $42_B$, i.e. the signaled residual signal for component B, so as to obtain the second component signal 26, which forms the intra-component prediction residual for component B and is, consequently, then combined with the second component intra-component prediction signal $40_B$ by combiner 26B so as to result in the second component samples of the pictures of the video.

Similar to decoding branch $32_B$, the intra-component predictor $34_C$ of the third component decoding branch $32_C$ is controlled via intra-component prediction parameters $44_C$ present in data stream 12 so as to perform the intra-component prediction and derive the intra-component prediction signal $40_C$, which in turn is combined by combiner $26_C$ with the third component signal 30. Module 28 generates the third component signal 30 as the intra-prediction residual on the basis of third component residual data $42c$ in data stream 12 and using inter-component prediction on the basis of both the first and second component signals 22 and 26 with the inter-component prediction of module 28 being controlled via inter-component parameter data for the third component, namely $44_C$ in data stream 12. By the combination in combiner $36_C$, the component C of the pictures in the video results. The combination in combiners $36_A$ to $36_C$ may be implemented, as depicted in FIG. 2, as an addition although other combinations may be used as well, such as, for example, a multiplication.

Figure 3:
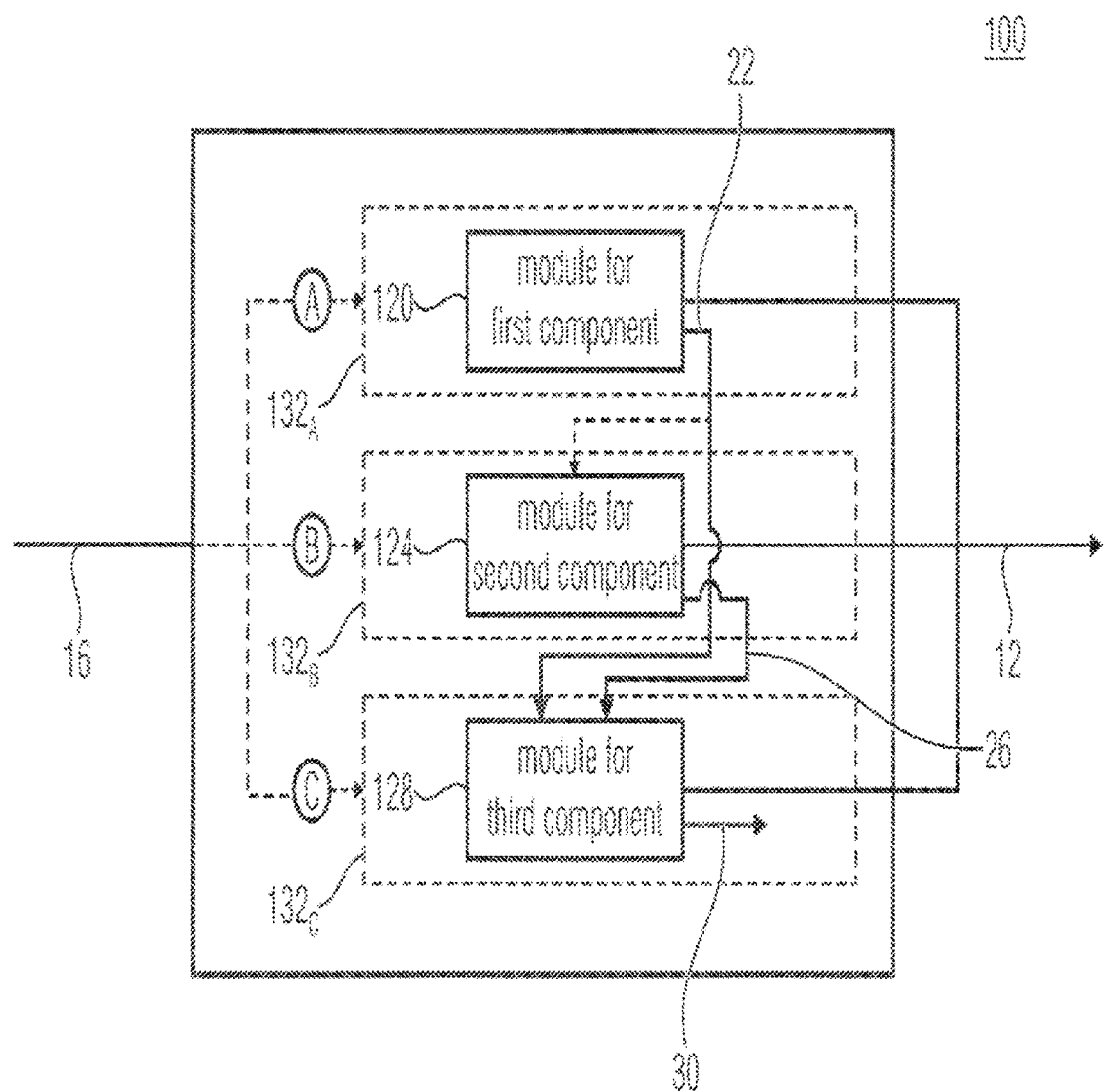
FIG. 3 shows a block diagram of an encoder fitting to the decoder of FIG. 1 in accordance with an embodiment.
Figure 4:
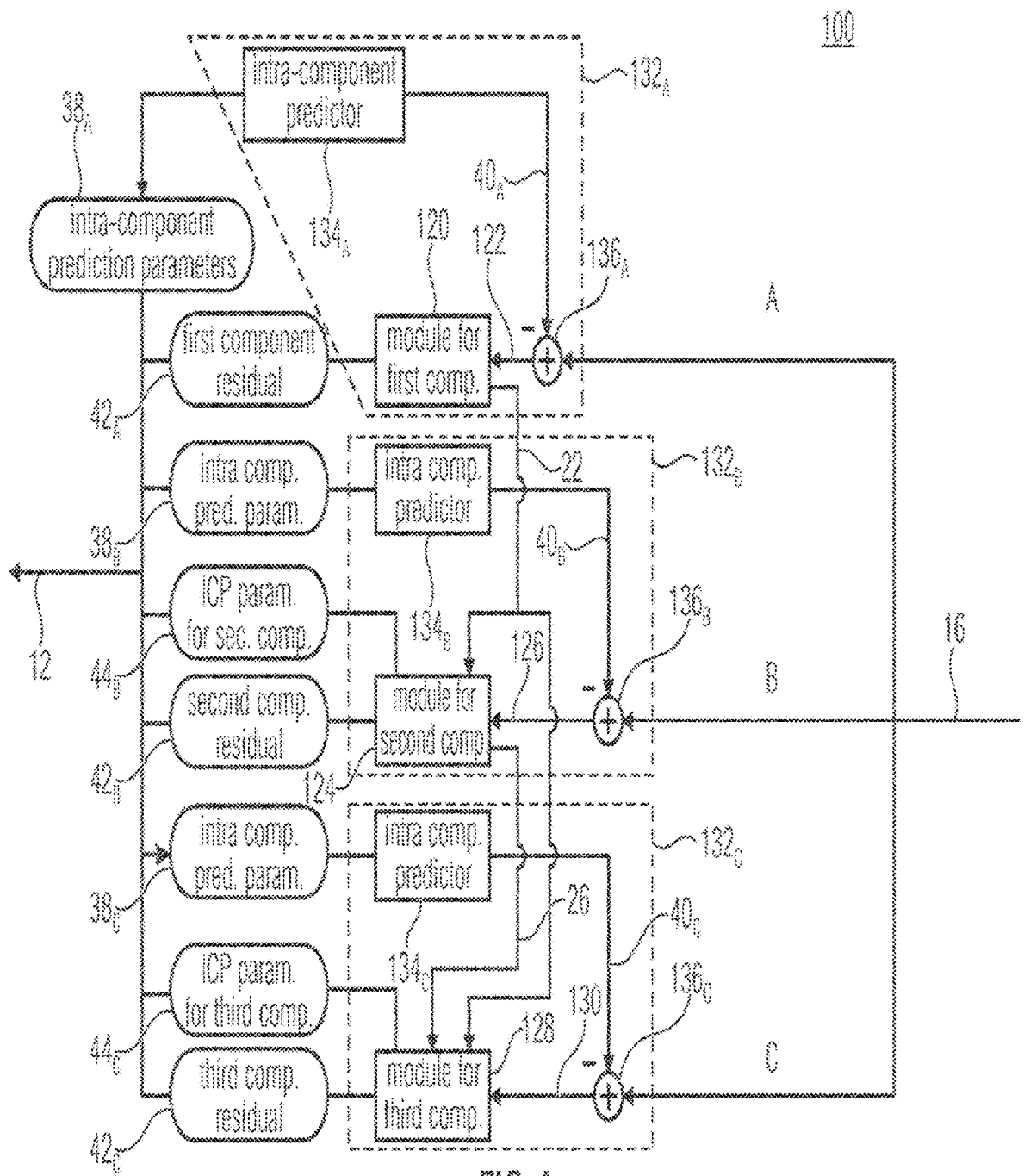
FIG. 4 shows a block diagram of an encoder fitting to the decoder of FIG. 2 in accordance with an embodiment.

As announced above, FIGS. 3 and 4 show embodiments of corresponding encoders, i.e. encoders fitting to the decoders shown in FIGS. 1 and 2, respectively. FIG. 3 shows an encoder 100 corresponding to the decoder 10 of FIG. 1. The encoder 100 receives the video 16, as depicted in FIG. 1, spatially sampled with respect to different components A, B and C in order to encode same into data stream 12. To this end, encoder 100 is constructed in a manner corresponding to FIG. 1. Owing to this correspondence, the elements of encoder 100 are referred to using reference signs which differ from those used with respect to the decoder merely in that 100 is added to the respective reference sign of the corresponding element in the decoder. Accordingly, the encoder 100 of FIG. 3 comprises for each of components A, B and C a respective module for the respective component, namely modules 120, 124 and 128, wherein module 120 is for coding the first component signal 22 into data stream 12, module 124 for encoding the second component signal 26 into data stream 12 and module 128 for encoding the third component signal 30 into data stream 12, wherein module 128 uses inter-component prediction from the first and second component signals 22 and 26. Just as described above, signals 22, 26 and 30 may represent residual signals, namely prediction residual signals of an intra-component prediction performed within component-specific coding branches $132_A$, $132_B$ and $132_C$, respectively.

Accordingly, FIG. 4 shows a more specific embodiment of the encoder of FIG. 3, corresponding to the decoder of FIG. 2. Correspondingly, encoder 100 of FIG. 4 comprises three component-specific coding branches $132_A$, $132_B$ and $132_C$, each comprising an intra-component predictor $134_{A,B,C}$, a residual former $136_{A,B,C}$ and the respective module 120, 124 and 128, respectively. As far as the intra-component predictors $134_{A-C}$ is concerned, they act in a similar manner as the respective predictors $34_{A-C}$ at the decoder side: they generate, by way of intra-component prediction, the respective intra-component prediction signals $40_A$, $40_B$ and $40_C$ on the basis of already encoded portions of the respective component of video 16 with the difference only residing in relation to the intra-component prediction parameters $38_{A-C}$: while predictors $34_{A-C}$ are controlled by the latter, predictors $134_{A-C}$ adjust the same in, for example, a rate/distortion optimization sense or the like. The residual formers $136_{A-C}$ form the prediction residual between the intra-component prediction signal $40_{A-C}$ and the co-located portion of the respective component of video 16 so as to obtain a respective first order component residual signal 120, 124 and 130 which is then in a lossy manner coded into data stream 12 by the respective module 120, 124 and 128, respectively. The reconstructible version of the respective first order prediction residual signal 122, i.e. freed from the coding loss introduced by module 120, is signal 22 then used by module 124 as a basis for inter-component prediction so as to encode prediction residual signal 126 into data stream 12. As an outcome of the encoding, module 120 generates the first component residual data $42_A$, which is then inserted into data stream 12. Likewise, module 124 generates, as an outcome of the encoding of inbound residual signal 126, second component residual data $42_B$ and ICP parameter data $44_B$, which is then inserted into data stream 12. On the basis of the latter data, the reconstructible version of residual signal 126 may be derived, i.e. the reconstructible version 26 then used by module 128 for inter-component prediction along with residual signal 22 for encoding first order residual signal 130 into the data stream. As an outcome of the encoding of module 128, module 128 outputs the ICP parameter data $44_C$ and the respective residual data $42_C$.

After having described various embodiments of decoders and encoders with respect to FIGS. 1 to 4, various embodiments are described which relate to various possibilities as to how to adapt the two-source ICP prediction performed by module 28 and 128, respectively. However, before that a brief detour is made to H.265/HEVC as an example for a hybrid video compressing scheme and in order to motivate the advantages resulting from the two-source ICP prediction However, all statements and the whole description outlined below should not be treated as being restricted to an extension of H.265/HEVC. Rather, the following description merely exemplarily sometimes mentions H.265/HEVC explicitly.

In the case of hybrid video compression schemes like H.265/HEVC, a prediction signal is generated using temporal or spatial or inter-view prediction (predictive coding) and the resulting prediction, referred to as residual, is then transformed, quantized and transmitted to the decoder (transform coding). Several entry points for the inter-component prediction (ICP) are possible. For example, the ICP could be applied onto the original sample values. With respect to the embodiments of FIGS. 1 to 4, this means that the source of ICP, namely signals 22 and 26, may not necessarily be residuals of intra-component prediction. Rather, they may relate to the original source signal, i.e. video 16, directly, i.e. in the spatial domain, or the ICP is performed on the original signal, i.e. video 16, but in the spectral domain, i.e. with respect to transform coefficients of a spectral decomposition transform, such as DCT locally applied in units of transform blocks of pictures, or transform coefficients of a wavelet transform. Due to implementation and application efficiency aspects, i.e. in order to improve the same, ICP may however be performed onto intra-component prediction residual signals as described and illustrated above with respect to, for example, FIGS. 2 and 4. For such an approach, an affine predictor may be employed due to complexity reasons. Further simplification leads to a linear predictor. In the latter case, only the gradient of the predictor may have to be transmitted as prediction parameter in the bitstream as part of ICP parameter data $44_B$ and $44_C$, respectively. In the following, this parameter is often denoted as a. It is noted here for the sake of simplification that the following portions of the specification of the application assume the usage of a linear predictor. The extension of the embodiments outlined further below, however, may easily be extended to an affine or more complex predictor.

Using a linear predictor, an ICP approach for residuals could be generally formulated as:

$$r'(x,y) = r_B(x,y) + \alpha \times r_0(x,y)$$

In the formula above, r'(x,y) is the final residual sample value for component B at the spatial position (x, y), $r_B(x, y)$ the decoded/signaled residual sample for component B, i.e., extracted from the bitstream, α the prediction parameter for component B contained in $44_B$ and $r_0(x, y)$ the reconstructed residual sample of component A at the same spatial position in the prediction source, e.g., the luma component, wherein $r_0(x, y)$ may be $r_A(x, y)$, i.e. the signaled residual of component A. Please note that α can be a floating point value.

For example, see module 24 of the above decoder embodiments. Module 24 could apply ICP in that module 24 uses the residual signal 22 as the prediction source $r_0$, multiplies same using α as signaled within ICP parameter data $44_B$ and adds the signaled residual signal as derived from the residual data $42_B$, namely $r_B$, so as to derive the inter-component prediction residual signal for component B, i.e. 26, i.e. r'.

Due to implementation aspects, floating point values may be mapped to integer values. For example, the floating point value α may be allowed to be in the range between −1 and 1, inclusively. Using three bit precision for the precision, the formula can be rewritten to as follows:

$$r'(x,y) = r_B(x,y) + (\alpha \times r_0(x,y)) \gg 3$$

The right shift operation is exactly a division by two to the power of three. Therefore, the floating pointed a can take the following integer values.

$$\alpha \in \{0, \pm1, \pm2, \pm3, \pm4, \pm5, \pm6, \pm7, \pm8\}$$

Again, due to implementation aspects, a can also restricted to the following values.

$$\alpha \in \{0, \pm1, \pm2, \pm4, \pm8\}$$

That is, the last mapping allows the decoder, or to be more specific module 24, for example, to reconstruct the integer-valued α as follows with $\alpha_d$ being the decoded value from the bitstream, i.e. the one actually comprised within the ICP parameter data $44_B$ in the data stream 12:

$$\alpha = 1 \ll \alpha_d$$

The ICP approach explained above representatively with respect to module 24, for example, can itself be split into three modules or facets. The first facet specifies the prediction source, the second facet specifies the prediction model, the third and the last facet specifies the ICP prediction parameter(s) or, to be more specific, the prediction model parameter(s). Given the formulas above, the prediction source is then $r_0$, the prediction model is the linear predictor using the same spatial position in the source component as input and the only prediction model parameter is a.

There is a strong dependency between the second and the third facet/module. An example of such a dependency would be again the simple linear predictor using the same spatial location in another component, i.e. the prediction source, as the input. In this example, due to the limitation to the linear predictor using the same spatial location, only one prediction (model) parameter is necessitated, and hence only this single prediction parameter, i.e. α, needs to be transmitted in the bitstream. There is also an interaction between the prediction source and the prediction model. Usually, the luma residuals are taken as the prediction source. This is the case, for example, with respect to module 24 in the case of using luma as component A, and a first chroma component as component B. However, if all available components are used as prediction source, an appropriate predictor has to be used, i.e. a predictor that involves samples from both components. This is the case for module 28. This module has two components available, namely components A and B. Staying at the same example with two prediction sources, i.e. the luma component and the first chroma component as components A and B, for example, the linear predictor would necessitate two model parameters instead of one. To be more precise, a linear predictor which could be used for module 28 may be defined as follows:

$$r''(x,y) = r_C(x,y) + \alpha_0 \times r_0(x,y) + \alpha_1 \times r_1(x,y).$$

That is, as far as module 28 is concerned, two prediction sources are available, namely signals 22 and 26. The signal 22 is $r_0$ and the signal 26 is $r_1$. That is, for ICP module 28 has available the co-located portions of signals 22 and 26 for ICP of a currently ICP predicted portion of signal 30, i.e. r'. In particular, module 28 uses a weighted sum of these co-located portions, namely signal 22 weighted by $\alpha_0$ and signal 26 weighted by $\alpha_1$, with the weighted sum being corrected by addition of the signaled residual as obtained from the residual data $42_C$, namely $r_C$.

As far as the relation between modules 28 and 24 is concerned, the following shall be noted. As depicted by the continuous lines in FIGS. 2 and 4, module 24 may use ICP on the basis of first component signal 22 and the second component signal 26 is obtained by ICP prediction and combination with the transmitted second component residual data $42_B$, i.e. r' may serve as a basis, i.e. one prediction source, of the ICP performed by module 28, i.e. r' may be used as $r_1$. But as has also been described above, in accordance with an alternative, module 24 does not use ICP. In that case, in FIGS. 2 and 4 the connection between module's 20 output on the one hand and module 24 on the other hand would be left out (or between module 120 and 124). In that case, $r_1$ would be $r_B$. In accordance with a further embodiment, the embodiments of FIGS. 2 and 4 could be modified in that $r_1$ is chosen to be equal to $r_B$ despite module 26 using ICP on the basis of component A. In that case, the arrow leading from module 24 to module 28 in FIG. 2 would start from a further output of module 24 other than the output leading to the combiner $36_B$.

Thus, in accordance with the embodiments outlined above, the possibility is provided to use multiple prediction sources for ICP, wherein the operation characteristics of the ICP approach are further extended in order to achieve higher compression efficiency. In the following, various details are presented with respect to the rather general multiple prediction source ICP described up to now. The following description first deals with the a possible global signaling of the multiple source ICP. Then, the local signaling of the multiple source ICP in accordance with various embodiments is dealt with. Then, additional dependencies for the multiple source ICP and further techniques enabling higher efficiency for the image and video compression application are described.

A kind of global signaling of multiple sources for ICP involves the possibility that the multiple source ICP approach can be turned on or off. When the multiple source ICP is enabled using a global flag transmitted in an appropriate level, an additional bit or a series of bits is transmitted, for example, for each transform block, or each prediction unit, or coding unit, signaling its usage. The global flag represents a kind of multiple source ICP signalization in the data stream switching between various ICP coding modes of a set of ICP coding modes including a multiple source ICP coding mode and at least one non-ICP coding mode. There may be various multiple source ICP coding modes as well, differing, for example, in adjustability of the ICP domain, i.e. spatial or spectral domain, and so forth. Accordingly, the global flag could be a single bit or a series of bits specifying further the prediction model in terms of one or more prediction parameters. The "additional bit or a series of bits transmitted for each transform block, or each prediction unit, or coding unit" in case of multiple source ICP being enabled, is an example for the aforementioned ICP parameter data $44_C$.

The global flag may be transmitted in a sequence parameter set, such as the sequence parameter set of H.265/HEVC, or in the picture parameter set, or even in the slice header. The granularity depends on the usage of additional tools, e.g. for tiles or wavefront processing, both for parallel processing, and even the signaling in different levels is possible. For example, the multiple source ICP could be enabled for the whole video sequence, but there could be a disablement for a specific content in the sequence. Given such an example, the global flag in the picture parameter set would override the flag in the sequence parameter set, for example.

Thus, to summarize, in accordance with an embodiment, the decoder 10 could be configured to be responsive to a multiple source ICP signalization 200 inserted into data stream 12 by encoder 100 so as to switch, for different ICP mode portions 202 of the multi-component video 16, between ICP coding modes of a set of ICP coding modes including a multiple source ICP coding mode and a non-ICP coding mode.

Figure 5A:
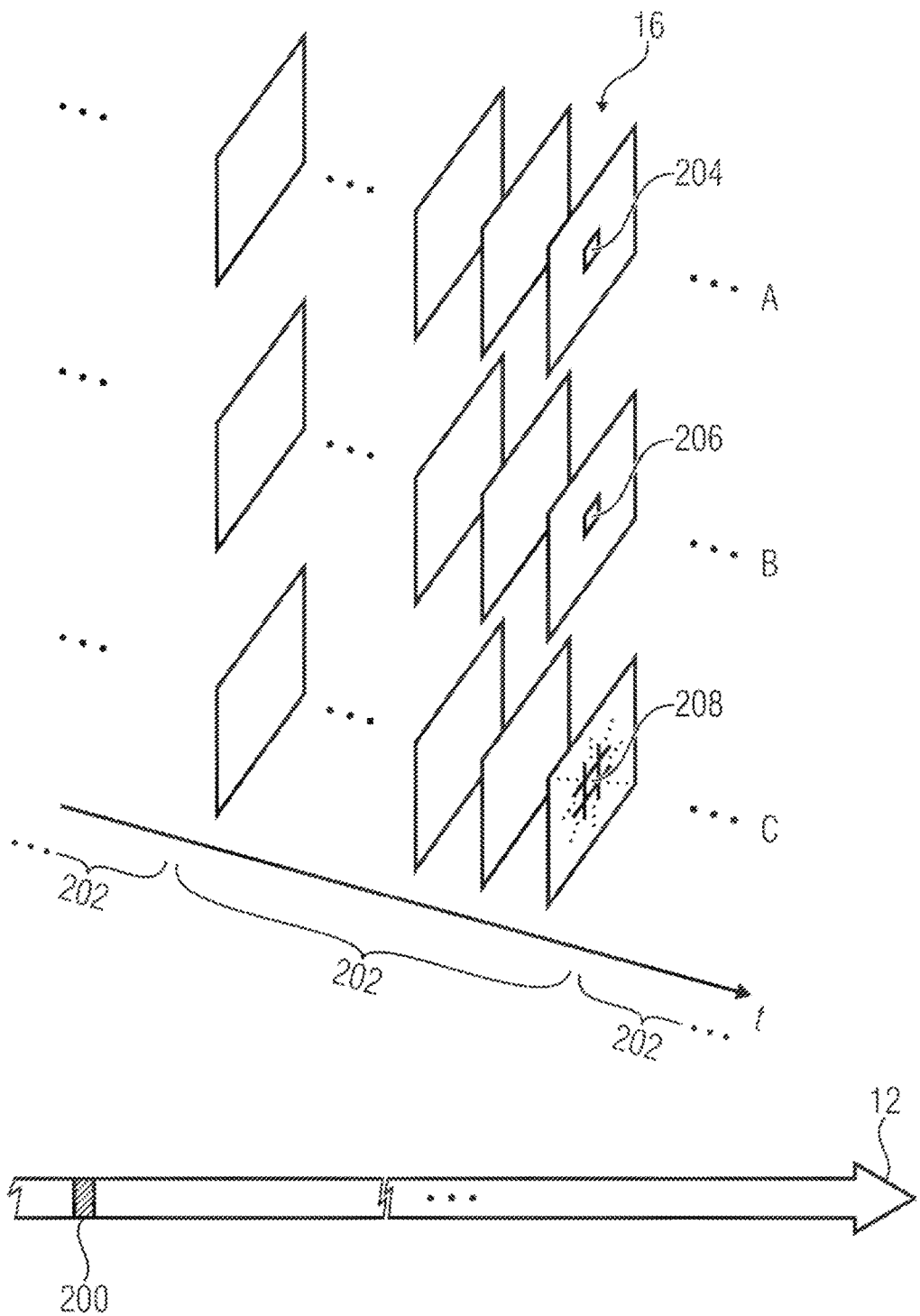
FIG. 5a shows a schematic diagram of an embodiment according to which a multiple source ICP signalization is able to switch on and off multiple source ICP.

In accordance with the multi-source ICP coding mode, inter-component prediction is performed on the basis of a signaled one of spatially corresponding portions 204 and 206 of the first and second component signals 22 and 26 of the components A and B with the signalization being done explicitly or implicitly within data stream 12. Alternatively, the multiple source ICP coding mode involves inter-component predicting the third component signal 30 of component C on the basis of a combination such as a weighted sum, of spatially corresponding portions 204 and 206. To be more precise, imagine that the multiple source ICP signalization 200 of FIG. 5a signals for the middle ICP mode portion of video 16 that multiple source ICP coding mode is enabled. In that case, modules 28 and 128, respectively, could perform ICP for component C block-wise in, for example, units of blocks 208, which may be, for example, prediction blocks or the like, wherein the ICP parameter data $44_C$ indicates for these blocks 208 whether the respective block 208 is inter-component predicted from spatially corresponding portion 204 or spatially-corresponding portion 206. Alternatively, in blocks 208 of pictures within middle portion 202, the third component signal 30 is predicted from a combination of both portions 204 and 206. ICP parameter data $44_C$ may then indicate the manner in which each portion 208 is inter-component predicted from co-located portions 204 and 206 in terms of, for example, weighting factors $\alpha_0$ and $\alpha_1$ indicating the weights of the weighted sum of portions 204 and 206 yielding the inter-component predictor for the respective block 208.

In the non-ICP coding mode, inter-component prediction may not be available for the respective ICP mode portion 202. Accordingly, for such an ICP mode portion, no ICP parameter data $44_C$ needs to be present in the data stream 12. Alternatively, for such an ICP mode portion 202, inter-component prediction may be performed by modules 28 and 128, respectively, from a fixed one of components A and B. For example, blocks 208 of such a non-ICP coding mode portion 202 may be ICP predicted from the co-located block 204 of component A or all blocks 208 may alternatively be inter-component predicted from co-located block 206, but a switching between blocks 208 is not feasible, i.e. either all blocks 208 within portion 202 are inter-component predicted from blocks 204 of component A or all blocks 208 within portion 202 are inter-component predicted from respective co-located block 206 of component B.

As already stated above, ICP mode portions 202 may be picture sequences, individual pictures, or slices or a sequence of slices. As indicated above, for ICP mode portions 202 for which the multiple source ICP coding mode is enabled, the ICP parameter data $44_C$ comprises, for example, two weights $\alpha_0$ and $\alpha_1$ for portions 208, while for ICP mode portions 202 for which the non-ICP coding mode is active, either no ICP parameter data $44_C$ is present, or the ICP parameter data $44_C$ signals for blocks 208 merely one of weights $\alpha_0$ and $\alpha_1$ with the other being set to zero for all blocks 208 within the respective portion 202.

Figure 5B:
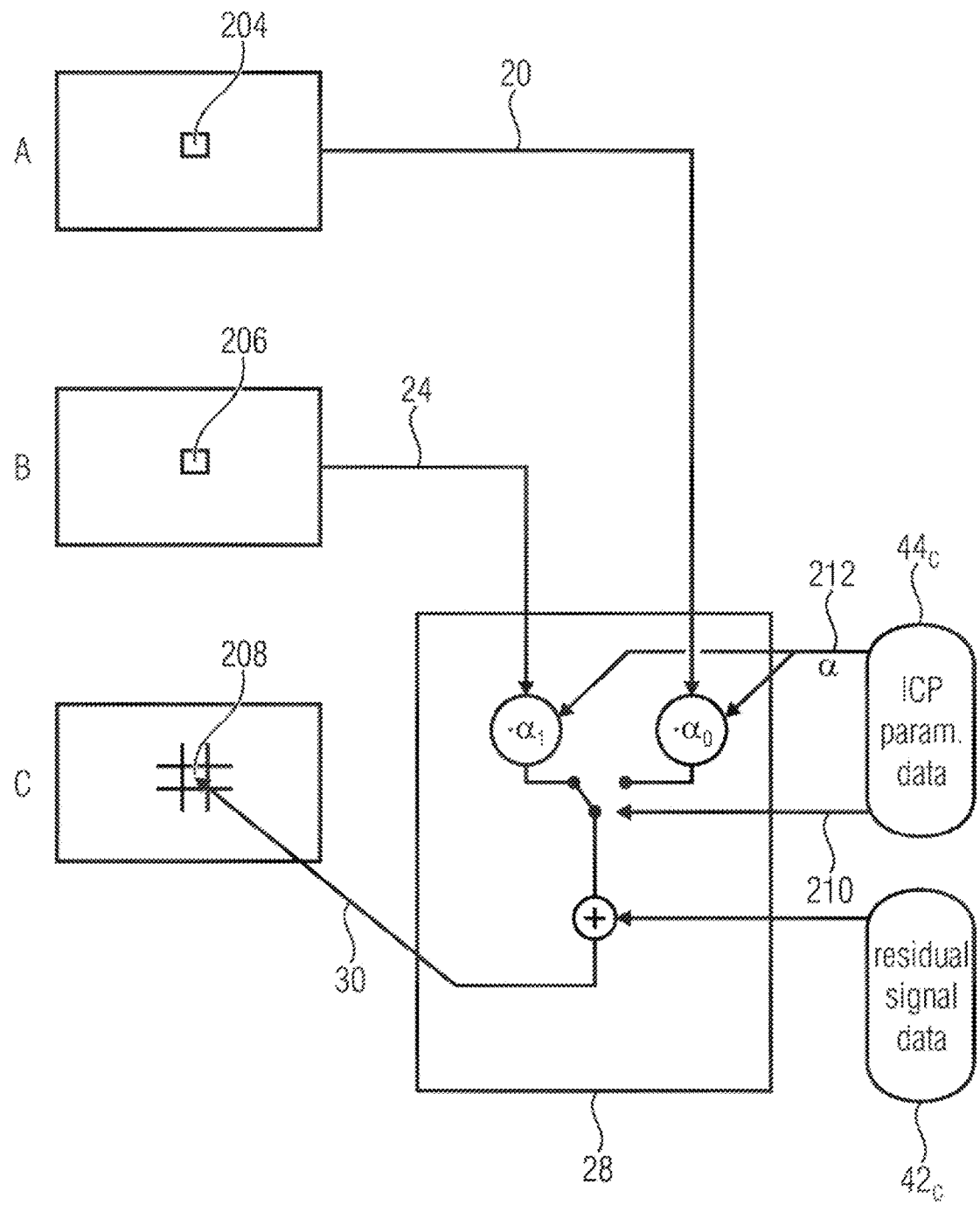
FIG. 5b shows a block diagram of an embodiment for the multi-source ICP module according to an embodiment where ICP signalization comprises an ICP prediction mode parameter in form of a weight and ICP source indicator.

Several possibilities exist for the local signaling of multiple sources for ICP. For example, if multiple sources ICP is used, a decision 210 for the prediction source may be transmitted locally as part of the ICP data $44_C$ as can be seen in FIG. 5b. For example, components A, B and C may be luma, first chroma and second chroma, for example. Then, the ICP parameter data $44_C$ may comprise a 210 flag indicating for a respective block 208 whether the source for inter-component prediction is luma, i.e. A, or the first chroma component, i.e. B. The blocks 208 may be coding blocks, prediction blocks or transform blocks. Coding blocks are, for example, blocks at which the intra-component prediction parameters $38_C$ switch between spatial and temporal prediction. Prediction blocks may be blocks at which the intra-component prediction parameters $38_C$ signal or vary the prediction parameters associated with the sort of prediction signaled for the coding block which the respective prediction block is part of. For example, if spatial prediction is signaled for the coding block, the prediction parameters for the prediction block or prediction blocks of that coding block may signal a spatial direction along which the respective prediction block is to be spatially predicted from neighboring already decoding/encoded portions of component C, and in case of a temporal prediction mode being signaled for the coding block to which the respective prediction block belongs, the prediction block may signal a motion vector as prediction parameter. Transform blocks may be blocks at which the intra-component prediction residual for component C is spectrally decomposed. In this regard, it should be noted that a flag 210 indicating whether the source for prediction is luma or first chroma component could be coupled or independent from other ICP prediction parameters 212, such as for example the prediction weight $\alpha$, which is used as $\alpha_0$ in the case of component A forming the ICP prediction source, and as $\alpha_1$ in the case of component B forming the ICP prediction source. The case of dependency is given, for example, when the prediction source is signaled after the prediction parameter(s), such as the weight. On the other hand, the independent case may be given when the source is signaled by way of flag 210 for a prediction block or a coding block but the ICP prediction parameters 212 are transmitted for each transform block.

Given the example above, the flag 210 indicating the prediction source may be transmitted only for blocks 208 of component C, such as, for example, only for transform blocks of the second chroma component. It may be that the ICP prediction source is signaled for a block 208 as part of the ICP parameter data $44_C$ only in case of the ICP prediction weight $\alpha$ for block 208 is signaled within the ICP parameter data $44_C$ as not being equal to zero, meaning that ICP prediction should be performed for block 208 of component C. There are two situations where the condition for multiple source are given. The first case occurs when the respective transform blocks of the first component, such as the luma component, and the second component, such as the first chroma component, inherit residuals. The second case is given when the luma transform block inherits residuals while the first chroma component consists of zero-valued residual values only, but it is predicted from the luma transform block.

For the flag 210 indicating the ICP prediction source, a fixed context model could be applied. A dependency on the situation where multiple sources occur is also possible resulting in two different context models. Furthermore, there could be a dependency on other ICP prediction parameter(s) 212, such as the weight. For example, a negative a may result in a different context model than a positive a. Another possibility is the dependency on the absolute value of a. In this example, an absolute a larger than two would result in the usage of a different context model than the case where a is equal or smaller than two.

Figure 6:
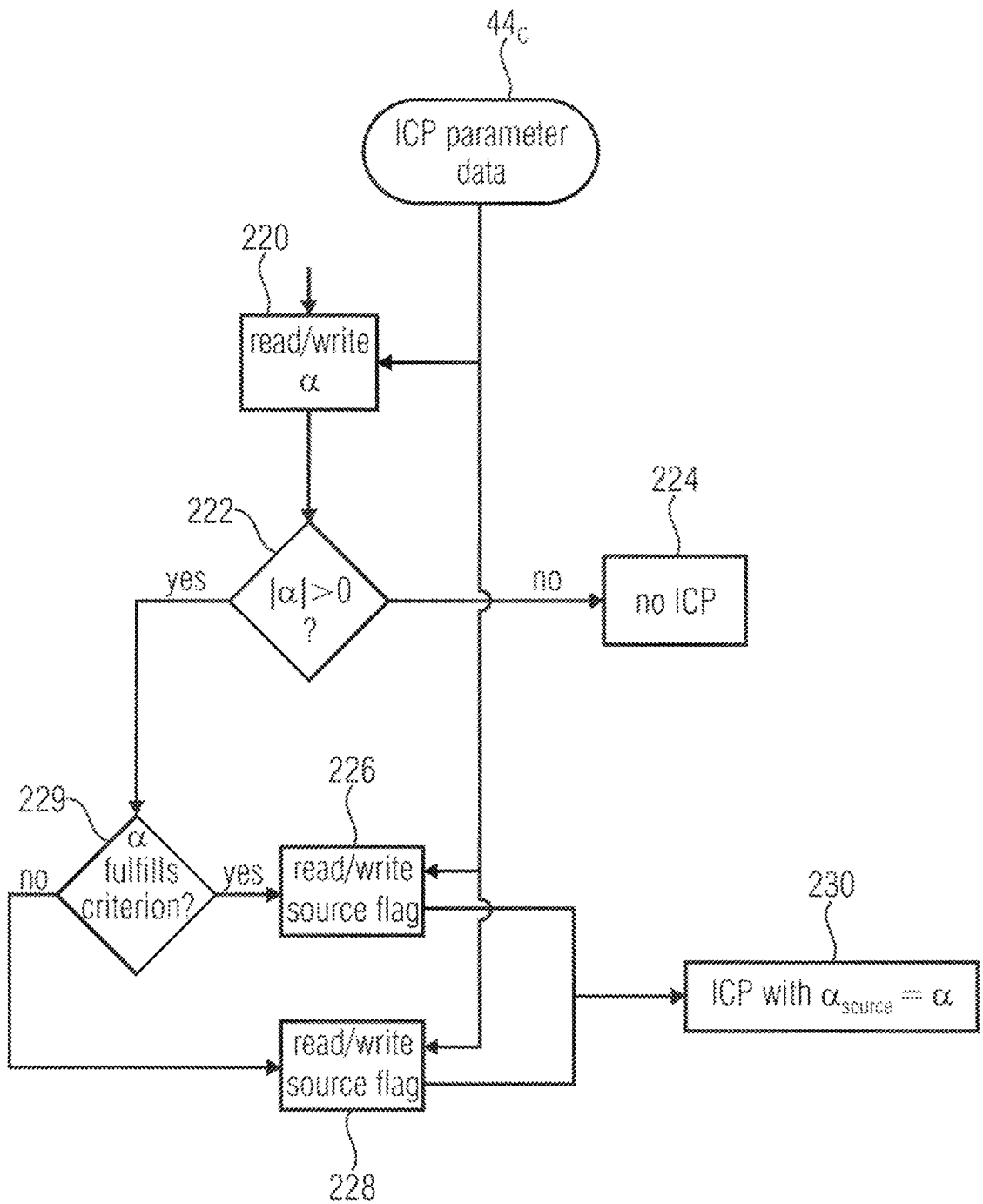
FIG. 6 shows a flow diagram of a treatment of ICP parameter data at decoder and encoder in accordance with an embodiment where the ICP parameter data for the third component comprises a weight and a source flag.

Accordingly, see for example FIG. 6, which illustrates an embodiment where the ICP prediction data $44_C$ indicates for a respective block 208 of component C a weight $\alpha$ as the ICP parameter 212, conditionally followed by an ICP source indicator 210. Accordingly, in accordance with FIG. 6, module 28 and 128, respectively, reads/writes a from/to the ICP parameter data $44_C$ in step 220 and if a check 222 whether $\alpha$ is equal to zero reveals that a is actually zero, then the ICP parameter data $44_C$ comprises for this block 208 no further ICP parameter data and no ICP is performed for block 208 on the basis of any of components A and B as indicated at 224. However, if $\alpha$ is non-zero, then the ICP parameter data $44_C$ comprises or signals for block 208 the ICP prediction source by way of a source flag 212 which is read from or written to the ICP parameter data $44_C$ in step 226 or 228.

For illustration purposes, FIG. 6 illustrates the possibility where different contexts are used for entropy encoding/decoding the source flag depending on whether $\alpha$ of step 220 fulfills a predetermined criterion or not, which circumstance is checked at 229. As outlined above, the criterion may be fulfilled if the absolute value of $\alpha$ is greater than a predetermined value such as two, or whether $\alpha$ is negative or the like. However, as already denoted above, the dependency of the context used to decode/encode the source flag on a is merely optional, and accordingly steps 229 and 228 may be left out in accordance with an alternative embodiment. Irrespective of whether step 226 or 228 applies, in the case of $\alpha$ being unequal to zero, the ICP is performed using $\alpha$ of step 220 as $\alpha_0$ in the case of ICP prediction source being the first component A, or $\alpha_1$ in case of the ICP prediction source indicated by the source flag being the second component B in step 230.

Thus, summarizing FIG. 6, the ICP parameter data $44_C$ may have one weight $\alpha$ coded into the data stream 12 for each block 208, i.e. 212. The coding/decoding in step 220 may involve spatial prediction on the basis of $\alpha$ of a neighboring block. Further, the ICP parameter data $44_C$ may have a source flag 210 coded into data stream 12 for block 208 depending on the value of $\alpha$ for this block 208 wherein the coding may comprise entropy coding, and in particular context-adaptive entropy coding using a context which depends on $\alpha$ for this current block 208. Accordingly, steps 226 and 228 may involve context-adaptive entropy coding/decoding. Step 230 involves the appliance of the above identified formulae comprising $\alpha_0$ and $\alpha_1$. $\alpha$ of step 220 is used as $\alpha_0$ or $\alpha_1$ depending on the ICP's source signaled by the source flag. The other of $\alpha_0$ and $\alpha_1$ is set to be zero, for example.

Extended ICP techniques are described next. In particular, when multiple sources are available as in the case of component C, a possible ICP predictor may accept both components for prediction, i.e. components A and B. In the case of using a linear ICP predictor, the ICP prediction parameters 212 would have to specify the weight of ICP prediction twice with the outcome or result of each component being linearly combined as described above.

Figure 5C:
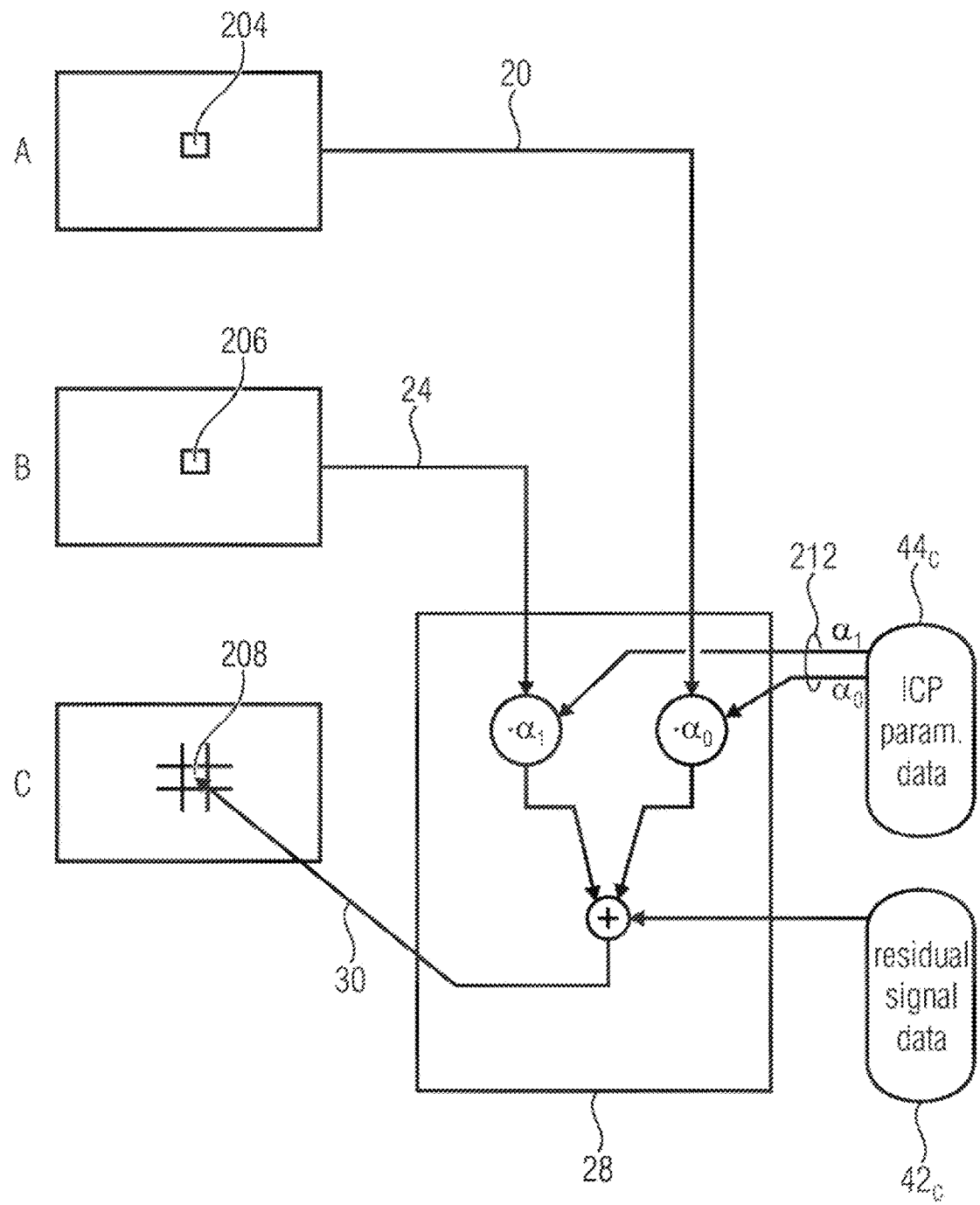
FIG. 5c shows a block diagram of an embodiment for the multi-source ICP module according to an embodiment where ICP signalization comprises an ICP prediction mode parameter in form of a weight per available ICP source.
Figure 7:
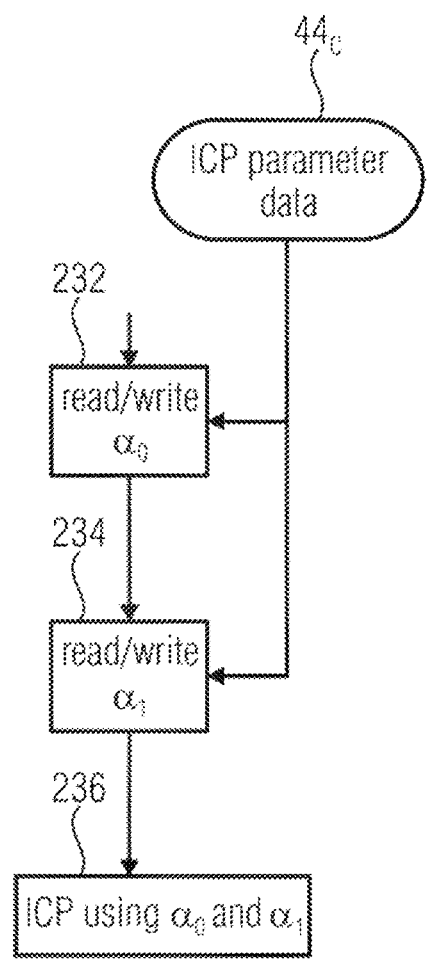
FIG. 7 shows a flow diagram illustrating the treatment of the ICP parameter data for the third component in accordance with an embodiment according to which the ICP parameter data comprises weights for a weighted sum of the available ICP sources.

FIGS. 5c and 7 illustrate the possibility according to which the ICP parameter data $44_C$ comprises or signals two weights $\alpha_0$ and $\alpha_1$ for each block 208 which are read/written in steps 232 and 234, respectively, with the same being applied at step 236 in accordance with the above identified formula.

Figure 5D:
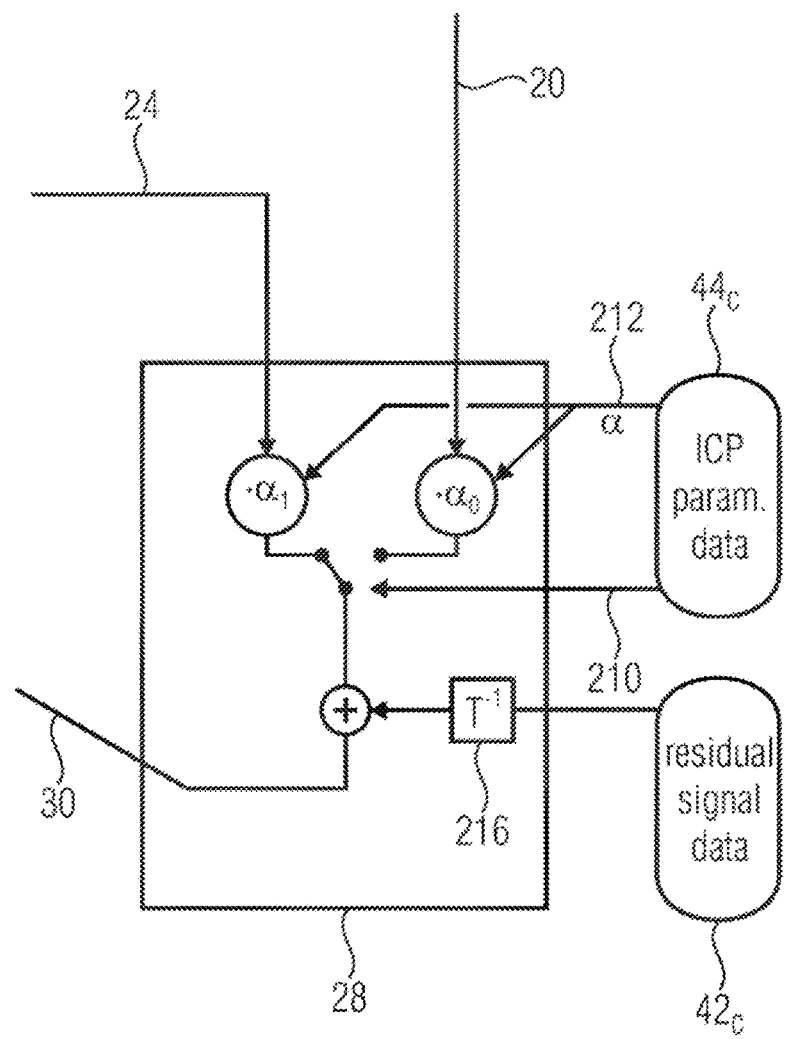
FIG. 5d,e show block diagrams of an embodiment for the multi-source ICP module according to FIGS. 5b and 5c, respectively, with the multi-source ICP performed in spatial domain.
Figure 5E:
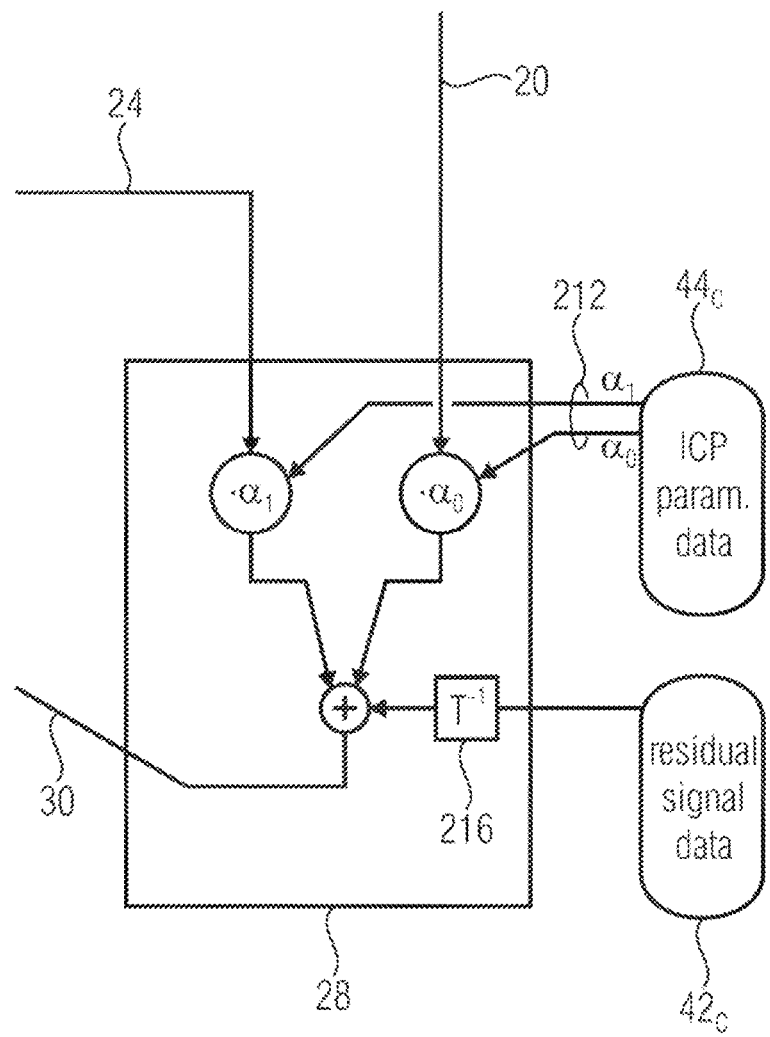
FIG. 5f,g show block diagrams of an embodiment for the multi-source ICP module according to FIGS. 5b and 5c, respectively, with the multi-source ICP performed in spectral domain.
Figure 5F:
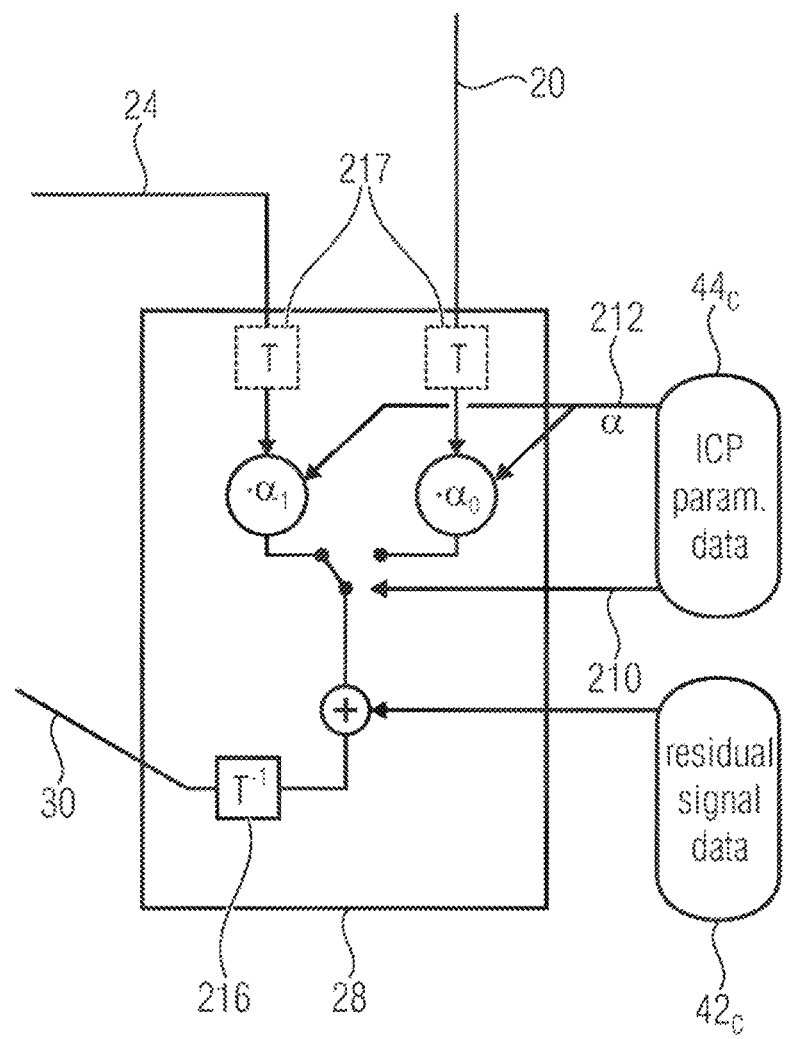
Figure 5G:
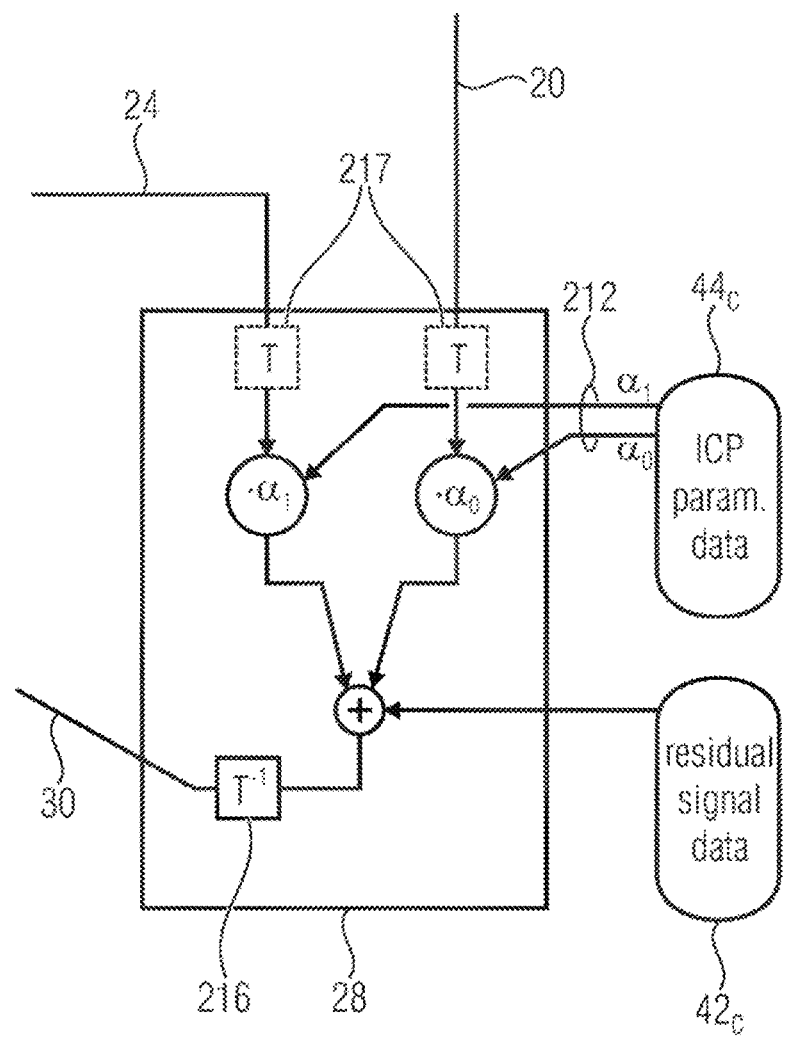

For sake of completeness, FIG. 5d-5g show the circumstance which has already mentioned above, namely that the ICP of module 28 may be performed in the spectral domain or in the spatial domain with the signaled component C residual signal signaled in $42_C$ in the spectral domain, i.e. in form of transform coefficients such as DCT coefficients or other transform coefficients of transform blocks or the like. Performing multiple source ICP in the spatial domain is illustrated in FIGS. 5d and 5e using module's 28 embodiment of FIGS. 5b and 5c as a basis, respectively. As is shown, signals 24 and 22 arrive in form of spatially corresponding, i.e. co-located, samples, are multiplied by weights $\alpha_0$ and $\alpha_1$, respectively, and summed up with the respective, i.e. collocated, samples as obtained by an inverse transform applied onto the arriving transform coefficients $42_C$ so as to yield signal 30. Performing multiple source ICP in the spectral domain is illustrated in FIGS. 5f and 5g again using module's 28 embodiment of FIGS. 5b and 5c as a basis, respectively. As is shown here, signals 24 and 22 may arrive in form of spatially corresponding, i.e. co-located, samples in which case they may be subject to a (forward) transform 217 so as to obtain a spectral decomposition of the same, i.e. transform coefficients. Alternatively, signals 20 and 24 already arrive in the transform domain. A transform 217 may be necessitated, for example, in case of miss-alignment of transform blocks between component A and C and B and C, respectively. The coefficients of signals 20 and 24 are multiplied by weights $\alpha_0$ and $\alpha_1$, respectively, and summed up with the respective, i.e. spectrally corresponding, coefficients as obtained from $42_C$. The summed-up coefficients are then subject to the inverse transform 216 so as to yield signal 30.

A further approach to improve the compression efficiency is the exchange of components for ICP. According to this approach, a syntax element may be signaled within the ICP parameter data $44_C$, specifying the correct order of the residuals. In this example, three transform blocks are, for example, reconstructed for a spatially corresponding portion, one for each component A, B and C, and ICP may be employed. Then, the syntax element specifies that the second and the third residual blocks belonging to second and third component residual data $42_B$ and $42_C$ are swapped. It would also be possible to exchange the first and the second component or even the first and the third component. This adaptive component switch, especially meaningful in the combination with ICP and multiple source ICP, allows the reduction of the energy with less prelude costs. For example, the application is allowed to switch the two chroma components B and C. In this example, the prediction of the two chroma components B and C from luma, i.e. component A, would result in the same costs. However, the prediction of the second chroma component using the first chroma component would necessitate more overhead, but the prediction of the first chroma component using the second chroma component necessitates less bits and results in lower costs. In such a case, a swap of the two chroma transform blocks would further reduce the total costs resulting in a higher compression efficiency.

Figure 8:
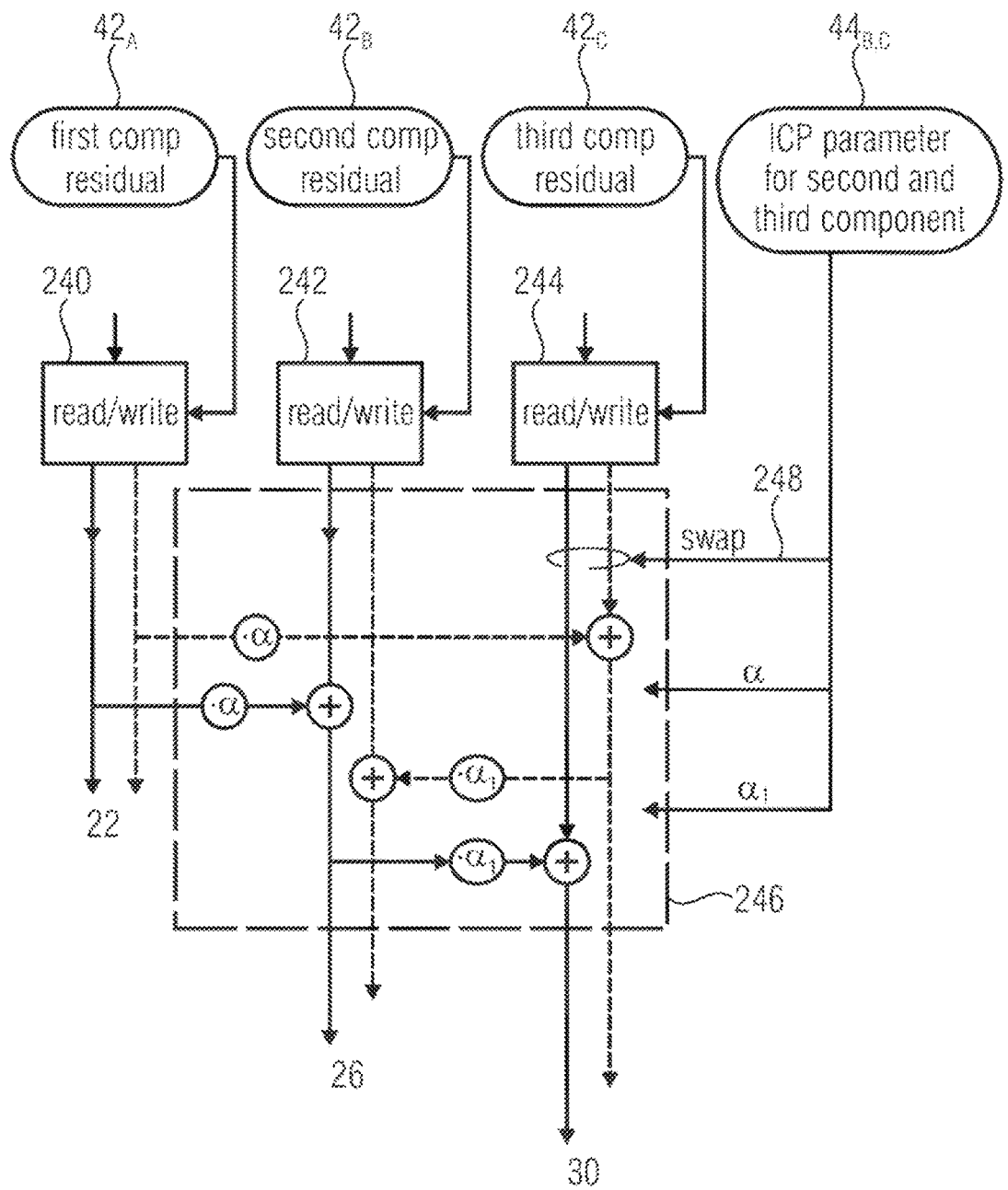
FIG. 8 shows a schematic diagram illustrating the treatment if ICP parameter data for the second and third components in case of using swapping components in order to improve the ICP efficiency.

This is depicted again in FIG. 8. FIG. 8 shows the first, second and third component residual data $42_A$ to $42_C$ being read/written in steps 240, 242 and 244, respectively, wherein the ICP by modules 24 and 28 and 124 and 128, respectively, namely 246, is controlled by the ICP parameter data $44_B$ and $44_C$ including a swap signalization 248, a weight for the ICP to be performed on the basis of the first component, namely $\alpha$, which is taken from the ICP parameter data $44_B$ for the second component and a weight to be used for the ICP between the second and third components, namely $\alpha_1$ which is taken from the ICP parameter data $44_C$ for the third component. Depending on the swap signalization, the transmitted residual signals $42_A$ to $42_C$ are either combined in the ICP 246 according to the continuous lines or the dashed lines. As can be seen, the second component signal 26 is either obtained by ICP on the basis of the first component or the third component depending on the swap signalization, and likewise the third component signal 30 is either obtained by ICP on the basis of the first component or the second component, respectively. In the non-swapped case illustrated by the continuous lines, ICP parameter data weights $\alpha$ and $\alpha_1$ remain their meaning, i.e. they control the ICP prediction of the second component signal 26 and third component signal 30, respectively, but in the swapped case, indicated by the dashed lines, the ICP parameter data weights $\alpha$ and $\alpha_1$ are re-interpreted as controlling the first stage and second stage ICP prediction, respectively: ICP parameter data weight $\alpha$ refers to the first stage ICP and ICP parameter data weight $\alpha_1$ refers to the first stage ICP. If not swapped, the re-interpretation does not change anything, but in the swapped case, the third component signal 30 is inter-component predicted before the second component signal 26, so that ICP parameter data weight $\alpha_1$ is now actually used for inter-component predicting second component signal 26. In other words, in the swapped condition, the second component B preliminarily assumes the role of the third component C and vice-versa, as far as inter-component prediction is concerned.

It is noted that the embodiment of FIG. 8 may be combined with the previous ones in that the ICP parameter data weight $\alpha_1$ of data $44_C$ may be accompanied with further data such as ICP parameter data weight $\alpha_0$ or source indicator 212: As data $44_C$ is re-interpreted to refer to the second stage ICP, i.e. to the second component the signal of which is subject to ICP—whether this is signal 26 or 30—two sources are available in both cases irrespective of the swap signalization 248, and ICP parameter data weight $\alpha_0$ could be used to control the ICP on the basis of component A in both cases and the source indicator could be interpreted as switching between components A and B in the non-swapped case and between components A and C in the swapped case, respectively.

Further, in a manner similar to FIG. 8, it would be feasible to change the afore-mentioned switching flag into a flag signaling a color space change i.e. switching between color spaces: for each component, the ICP prediction parameter $\alpha_0$ or $\alpha_1$ is transmitted, locally changing as described above; further, color domain change flag locally indicates whether the color domain is to be changed or not. If not changed, both second and third components B and C, for example, are individually predicted from A using $\alpha_0$ or $\alpha_1$ so as to reveal the two chroma components, respectively, and component A is treated as luma just as described above. If color change is signaled to take place, however, B and C, for example, are individually predicted from A using $\alpha_0$ or $\alpha_1$, respectively, but they are then commonly subject to a color space change transformation which, for example, linearly transfers the ABC color space into the YCC color space. While component B, for example, is predicted from A only in case of no color space change, it is, for example, effectively predicted from A and C in case of color space change. Even alternatively, two or more types of color change transformations mapping the signaled color space ABC to the YCC color space may be available and switched between by way of signalization 248. Thus, in locally varying manner, the color space in which the ABC components are transmitted, may change between two or more color spaces, and so the transformation to YCC does change between no transformation and color transformation as signaled by signalization 248. Signalization 248 may be transmitted in the data stream in units such as coding units, greater than or equal to units at which the ICP prediction parameter transmission takes place, such as transform blocks. Thus, $\alpha_0$ or $\alpha_1$, would be transmitted for components B and C at first blocks such as transform blocks, the residual $r_B$ transmitted for B would be combined with the residual $r_A$ transmitted for component A according to $r_B'=r_B+\alpha_0 \cdot r_A$ and likewise, the residual $r_C$ transmitted for C would be combined with the residual $r_A$ according to $r_B'=r_B+\alpha_1 \cdot r_A$, and the prediction residual signal (22, 26, 30) would finally obtained either by a color transformation which may be similar to a RGB to YCC color transform, denoted T for simplicity, or by directly adopting the residuals as the YCC prediction residual signal, i.e. either $(r_Y, r_{C1}, r_{C2})^T = T \cdot (r_A, r_B', r_C')^T$ or $(r_Y, r_B', r_{C2})^T = (r_A, r_B', r_C')^T$, respectively. Whether color space transform T is applied or not is controlled via signalization 248. T may be $$\begin{pmatrix} 1 & 1 & 0 \\ 1 & -1 & -1 \\ 1 & -1 & 1 \end{pmatrix},$$

for example.

The coding of the ICP prediction parameter $\alpha$, or $\alpha_0$ or $\alpha_1$ in data $44_B$ or $44_C$ mentioned above can be coded using the signaling of the integer nominator of the fractional value of the weight as described above, or can be even further improved. When ICP is applied in the R'G'B' colour space, the value of $\alpha$ (representatively used for any of $\alpha$, or $\alpha_0$ or $\alpha_1$) is mainly positive and relatively large, i.e., 1 or 0.5 in floating point precision. On the other hand, for Y'$C_b C_r$, the values of $\alpha$ is often centred on the zero value and is relatively small. An asymmetrical mapping and limitation of $\alpha$ can be employed in order to further improve the efficiency in terms of compression ratio. Given the observation, the a mapping can be as follows.

$\alpha \in \{0,\pm1,\pm2,\pm4,\pm8\}$ or $\alpha \in \{0,\pm1,\pm2,\pm4,\pm8\}$ Please note that, in order distinguish the maximum allowed value of $\alpha$, the sign of $\alpha$ should be transmitted first in the bitstream. In the case of symmetrical mapping the order is irrelevant, i.e., the sign can be transmitted after the transmission of the absolute value of $\alpha$. Moreover, the absolute value of $\alpha$ could be coded/decode by entropy coding using context-modeling depending on the sign of a so as to account for the different probability distribution for the frequency of occurrence of positive and negative values of $\alpha$.

In the following, some embodiments are discussed even more specifically.

In accordance with an embodiment, for example, in the case of two prediction sources as it was the case in the embodiments presented above, a flag 210, called source flag in FIG. 6 above, is transmitted after the specification of the ICP prediction parameter 212 and this flag 210 indicates which predictions source should be employed. Note that for this embodiment, the prediction source flag 210 is only necessitated when the prediction should be applied, which can be derived from the ICP prediction parameter.

In a further embodiment, independently from the specific ICP prediction parameter 212 of the respective block 208, such as the respective nested transform blocks in a prediction block, the source flag 210 indicating which prediction source should be employed is transmitted for each prediction unit. It should be noted that it is also possible to transmit the ICP prediction parameters 212 such as $\alpha$ in the prediction block level in this embodiment.

In another embodiment of the invention, independently from the specific prediction parameters of the nested transform blocks in a coding block, the flag indicating which prediction source should be employed, i.e. source flag, is transmitted for each coding block. It should be noted that it is also possible to transmit the ICP prediction parameters in the prediction block level or coding block level in this embodiment.

Figure 9:
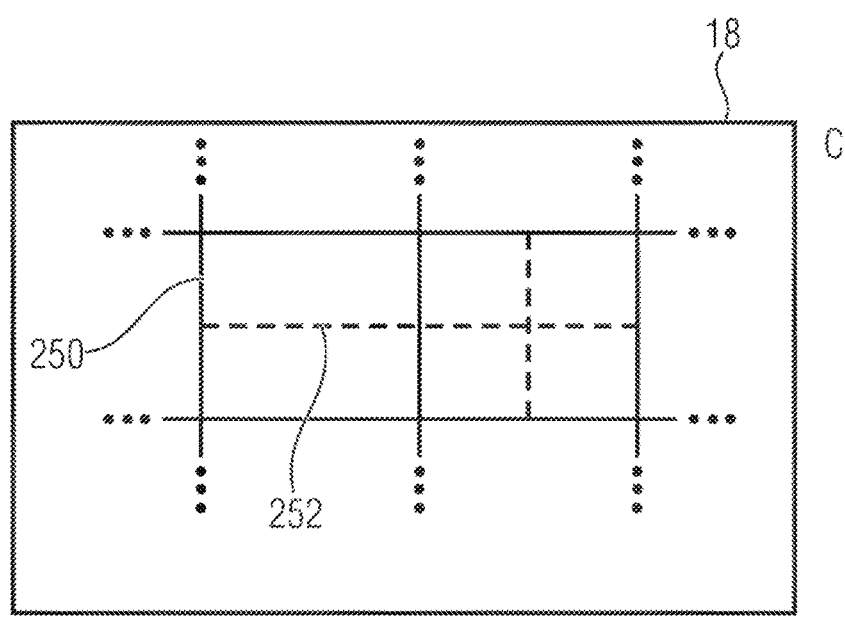
FIG. 9 shows a schematic diagram of a picture so as to illustrate the possibility of signaling source flag and weight at different granularities.

FIG. 9 illustrates the just outlined possibilities illustratively. In particular, as described above, the ICP parameter data $44_C$ may comprise two components, namely ICP prediction parameter 212 such as a weight $\alpha$ and an unconditionally coded ICP source flag 210. Other than depicted in FIG. 6, steps 226, 228 and 229 would be rearranged to be positioned between steps 220 and 222, wherein, as already outlined above, steps 228 and 229 may even be left out. In any case, FIG. 9 illustrates the possibility that the granularity at which the ICP parameter data $44_C$ signals the ICP prediction source is coarser than the granularity at which the ICP prediction parameter $\alpha$ is transmitted. In particular, while the ICP source flag is transmitted in units of blocks 250, indicated by continuous lines in FIG. 9, the ICP prediction parameter $\alpha$ is indicated in the ICP prediction parameter data $44_C$ in units of sub-blocks 252, i.e. sub-partitions of blocks 250. While FIG. 9 illustrates blocks 250 and 252 of picture 18 to be rectangular, it should be noted that blocks of other shapes may be used as well.

In a further embodiment, the source flag 210 indicating the prediction source may be coupled to the respective ICP prediction parameter(s) 212, such as the weight, i.e. the ICP prediction parameter(s) specified for the current transform block or the current prediction block or even the current coding block. In this embodiment, the source flag 210 indicating the prediction source may be coded only if the only prediction parameter in the case of $\alpha$ linear prediction is in the range of −0.25 and +0.25 (or −2 and +2 for the integer valued $\alpha$—or to be more precise, the integer valued nominator thereof), but inclusively. For example, see FIG. 6. Here, the ICP parameter or data $44_C$ necessitates the decoding of the source flag only in case of a being unequal to zero. Additionally, or alternatively, the source flag may be comprised by the ICP parameter data $44_C$ for a certain block only in case of a being in a certain value range, such as between −0.25 and +0.25, both inclusively, mentioned above. If a is outside that range, the source flag would not be explicitly transmitted within the data stream, but for example inferred to refer to the first component A, for example, as the ICP prediction source. For example, if component A is the luma component and components B and C are two chroma components, then a large absolute value of $\alpha$ is a hint that the predictions source for the second chroma component C is the luma component rather than the other first chroma component B. Thus, in FIG. 6 a further check would be positioned between 222 and 229 checking whether or not $\alpha$ is within the value range necessitating the transmission/reading of the source flag. If not, no source flag is read/written, otherwise step 229 is visited.

In another embodiment, the source flag indicating the prediction source is coupled to the ICP prediction parameter(s) of the first chroma component. In this embodiment, the source flag of ICP parameter data $44_C$ indicating the prediction source is, for example, coded/decoded only if the only ICP prediction parameter in the case of a linear predictor for the co-located block in the ICP parameter data $44_B$, i.e. $\alpha$, is between −0.25 and +0-25 or −2 and +2 for the integer value $\alpha$, both inclusively, when the value range may also be chosen differently. For example, a check could be added to FIG. 7, according to which it is checked whether the ICP parameter data $44_B$ indicates for the c-located block that the inter-component prediction of component B from the respective co-located block is performed using a weight α, the magnitude of which is, for example, above some predetermined value. If so, this may be used as a hint that the components A, B and C correspond to a YCC like color space in which case the third component C should most likely be ICP predicted on the basis of the second component, i.e. the putative first chroma component, so that in that case the source flag is inferred to identify the second component as ICP prediction source. If, however, the magnitude of α for the co-located block as indicated by the ICP prediction parameter data $44_B$ is smaller than the predetermined value, then the source flag is signaled as part of the ICP parameter data $44_C$ for the current block.

In accordance with an embodiment, the context model for the flag indicating the prediction source is independent from the ICP prediction parameter such as the weight. Consequently, one fixed context model is employed. This means, for example, that regarding the description of FIG. 6, steps 228 and 229 may be left out with the yes-path of check 222 leading directly to 226.

In another embodiment, however, the context model for the source flag depends on the ICP prediction parameter(s), such as the weight. When the linear predictor is employed, a different context model may, for example, be used if the only prediction parameter, namely the weight, is in the range between, for example, −2 and 2, both inclusively, in the case of an integer-valued prediction parameter as discussed above.

Further, a different context model may be used if the only ICP prediction parameter in the case of a linear predictor is negative. This has also been discussed above.

The usage of multiple prediction sources may be turned on and off using a flag transmitted in the sequence parameter set, for example, as has been discussed above with respect to FIG. 5. The transmission may, however, also take place in the picture parameter set or in the slice header.

The usage of multiple prediction sources can be specified in different hierarchical levels. For example, it can be specified in the sequence parameter set and the picture parameter set. Because the picture parameter set flag is lower, this embodiment enables the possibility to disable the multiple source ICP for a picture or a frame of the video sequence. In a further embodiment, the flag indicating the prediction source, i.e. the source flag, may depend on the relative difference between the ICP prediction parameter, i.e. the weight, for the current component and the ICP prediction parameter, such as the weight, for the previous component. If the relative difference is greater than a given limit, the flag is derived to be equal to one, for example. In other words, in case of FIG. 6, an additional check may be applied downstream check 222, wherein it is checked in this additional check whether the weight associated with the co-located block according to the ICP parameter data $44_B$ differs from a of the ICP parameter data $44_C$ for the current block by more than a predetermined amount. If yes, this may be interpreted as a hint that components A to C are related each other like a YCC color space and that accordingly the source flag may be inferred to identify the putative first chroma component, i.e. component B, as the ICP source for the ICP of component C. Otherwise, the reading/writing of the source flag is performed. In other words, responsive to ICP prediction parameter signalization 212 of data $44_C$, the third-component prediction parameter α may vary at sub-picture granularity, and likewise, responsive to ICP prediction parameter signalization for the second component signal in data $44_B$, a component-signal prediction parameter α varies at sub-picture granularity. Thus, the weights may vary locally between ICP for component B and multi-source ICP for component C. Thus, a check may be performed as to where the second-component and third-component prediction parameter differ by more than a predetermined limit, for example sing a difference or quotient of the a values as a measure of the deviation. For locations where they do not differ by more than the limit, the ICP source indicator 210 may be present in data $44_C$ while for locations where the limit is exceeded, the ICP source indicator 210 may be otherwise inferred as described above.

In accordance with a further embodiment, when multiple prediction source are available, the ICP prediction parameter(s) are transmitted twice specifying a predictor supporting a weighted combination of the prediction source, as has been outlined above with respect to FIG. 7.

In accordance with a further embodiment, a linear predictor is employed for multiple source ICP and the ICP prediction parameter is quantized. In this embodiment, the only absolute ICP prediction parameter is binarized using truncated unary code and coded and the sign is transmitted separately. The sign may be coded first and depending on the sign of the only prediction parameter, different context models may be used for the bins of the binary decomposition. In accordance with a further embodiment, the sign is coded first, and then depending on the coded sign, the quantization of the prediction parameter is performed differently, In this embodiment, the maximum allowed prediction parameters may be in the range between 0.25 and 1, both inclusively.

In accordance with an embodiment, a flag may indicate whether the second and the third component are exchanged. This has been outlined above with respect to FIG. 8. In this embodiment, the residuals constructed for the related transform block of the first chroma component may be treated as the residuals for the second component and vice versa.

With respect to above description of certain embodiments it is noted that same are easily transferable to multi-component picture coding.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded picture or video signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non— transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A decoder, comprising:
a processor configured to execute a program for decoding a multi-component video based on operations including:
reconstructing a first component signal relating to a first component of the multi-component video from a data stream;
reconstructing a second component signal relating to a second component of the multi-component picture video from the data stream; and
reconstructing a third component signal relating to a third component of the multi-component video using inter-component prediction (ICP) based on ICP information, the reconstructed first component signal and the reconstructed second component signal.

2. The decoder according to claim 1, the operations further including determining weights based on the ICP information, wherein the weights indicate contributions of the reconstructed first component signal and the reconstructed second component signal to the inter-component prediction.

3. The decoder according to claim 2, wherein the data stream includes the ICP information.

4. The decoder according to claim 2, wherein at least one of the weights is entropy-decoded based on context modeling and is represented by a sign value and an absolute value.

5. The decoder according to claim 4, wherein the absolute value is entropy decoded using context-modeling based on the sign value, and the sign value is decoded before the absolute value.

6. The decoder according to claim 1, wherein the decoder is configured to be responsive to a multiple-source ICP signalization in the data stream to switch, for different ICP mode portions of the multi-component video, between ICP coding modes of a set of ICP coding modes, which includes:
(a) a multiple-source ICP coding mode in which the decoder is configured to reconstruct the third component signal in a current sub-portion of a current picture of the multi-component video using inter-component prediction from a signaled one of, or a combination of, spatially corresponding portions of the reconstructed first component signal and the reconstructed second component signal,
(b) at least one of a non-ICP coding mode in which the decoder is configured to reconstruct the third component signal in a current sub-portion of the current picture of the multi-component video without using any inter-component prediction, and
(c) a fixed-one-source ICP coding mode in which the decoder is configured to reconstruct the third component signal in the current sub-portion of the current picture of the multi-component video using inter-component prediction from spatially corresponding portions of a fixed one of the reconstructed first component signal and the reconstructed second component signal, which is fixed within each portion of the multi-component video for which the decoder, in response to the multiple-source ICP signalization, switches to the fixed-one-source ICP coding mode.

7. The decoder according to claim 6, wherein the multiple-source ICP signalization is signaled in the data stream such that the ICP mode portions are single pictures, picture sequences or slices.

8. The decoder according to claim 1, wherein the first component is a luma component, the second component is a first chroma component, and the third component is a second chroma component.

9. The decoder according to claim 1, wherein the decoder is configured to switch, at a first sub-picture granularity, between reconstructing the third component signal in a current picture of the multi-component video using inter-component prediction from a spatially corresponding portion of the reconstructed first component signal, and reconstructing the third component signal in the current picture of the multi-component video using inter-component prediction from a spatially corresponding portion of the reconstructed second component signal.

10. An encoder, comprising:
   a processor configured to execute a program for encoding a multi-component video based on operations including:
   encoding a first component signal relating to a first component of the multi-component video into a data stream;
   encoding a second component signal relating to a second component of the multi-component video into the data stream; and
   encoding a third component signal relating to a third component of the multi-component video using inter-component prediction (ICP) based on ICP information, the first component signal and the second component signal.

11. The encoder according to claim 10, the operations further including determining weights based on the ICP information, wherein the weights indicate contributions of the first component signal and the second component signal to the inter-component prediction.

12. The encoder according to claim 11, wherein the operations further include inserting the ICP information into the data stream.

13. The encoder according to claim 11, wherein at least one of the weights is entropy-encoded based on context modeling and is represented by a sign value and an absolute value.

14. The encoder according to claim 13, wherein the absolute value is entropy encoded using context-modeling based on the sign value, and the sign value is encoded before the absolute value.

15. The encoder according to claim 10, wherein the first component is a luma component, the second component is a first chroma component, and the third component is a second chroma component.

* * * * *